United States Patent
Rakovitsky et al.

(10) Patent No.: US 10,455,378 B2
(45) Date of Patent: Oct. 22, 2019

(54) SYSTEM AND METHOD FOR GENERATING ANALYTICS FOR CONVERSATIONS WITHIN APPLICATIONS

(71) Applicant: ROKO Labs, LLC, New York, NY (US)

(72) Inventors: Dmitry Rakovitsky, Marlboro, NJ (US); Amy Kadomatsu, Edgewater, NJ (US); Sergei Selin, Davie, FL (US); Zakie Twainy, New York, NY (US); Aaron Weymouth, Brooklyn, NY (US)

(73) Assignee: ROKO Labs, LLC, New York, NY (US)

( * ) Notice: Subject to any disclaimer, the term of this patent is extended or adjusted under 35 U.S.C. 154(b) by 159 days.

(21) Appl. No.: 15/590,852

(22) Filed: May 9, 2017

(65) Prior Publication Data
US 2018/0332447 A1 Nov. 15, 2018

(51) Int. Cl.
| | | |
|---|---|---|
| *H04W 4/14* | (2009.01) | |
| *H04L 29/08* | (2006.01) | |
| *H04M 1/725* | (2006.01) | |
| *G06F 11/34* | (2006.01) | |

(52) U.S. Cl.
CPC .......... *H04W 4/14* (2013.01); *G06F 11/3438* (2013.01); *H04M 1/72552* (2013.01)

(58) Field of Classification Search
CPC .. H04W 4/14; G06F 11/3438; H04M 1/72552
See application file for complete search history.

(56) References Cited

U.S. PATENT DOCUMENTS

| 8,745,573 B2 | 6/2014 | Ben-Artzi et al. |
|---|---|---|
| 9,043,407 B1 | 5/2015 | Gaulke et al. |
| 9,621,492 B2 | 4/2017 | Park et al. |
| 2008/0086522 A1 | 4/2008 | Biggs et al. |
| 2008/0114837 A1 | 5/2008 | Biggs et al. |
| 2009/0281966 A1 | 11/2009 | Biggs et al. |
| 2011/0078105 A1 | 3/2011 | Wallace |
| 2013/0144961 A1 | 6/2013 | Park et al. |
| 2013/0151636 A1 | 6/2013 | Majeti et al. |

(Continued)

OTHER PUBLICATIONS

Office Action for U.S. Appl. No. 15/590,791, dated Dec. 11, 2018, Rakovitsky et al, "System and Method for Creating Conversations to Launch Within Applications", 21 pages.

(Continued)

*Primary Examiner* — Abdullahi E Salad
(74) *Attorney, Agent, or Firm* — Lee & Hayes, P.C.; Beatrice L. Koempel-Thomas

(57) ABSTRACT

A system and method for generating analytics based on creating interactions in the form of conversations for launch within applications are described. The analytics are further based on the data received by users of the applications in response to the conversations. Application developers can be supported in creating the conversations using software development tools to create one or more conversations and to configure the conversations for launch to one or more applications. Application users can respond to the conversations and the responses can be assessed by the processors associated with the software development tools to produce analytics to the application developers, as well as third-party platforms.

21 Claims, 27 Drawing Sheets

(56) References Cited

U.S. PATENT DOCUMENTS

| | | |
|---|---|---|
| 2013/0173723 A1* | 7/2013 | Herold .................. G06Q 10/10 |
| | | 709/206 |
| 2014/0279050 A1 | 9/2014 | Makar et al. |
| 2016/0043975 A1 | 2/2016 | Park et al. |
| 2016/0044380 A1 | 2/2016 | Barrett |
| 2016/0343378 A1* | 11/2016 | Chen ....................... G10L 17/22 |
| 2017/0048170 A1 | 2/2017 | Smullen et al. |
| 2017/0180276 A1 | 6/2017 | Gershony et al. |
| 2017/0180284 A1 | 6/2017 | Smullen et al. |
| 2017/0193997 A1* | 7/2017 | Chen ....................... G10L 17/22 |
| 2017/0237692 A1 | 8/2017 | Sheth et al. |
| 2017/0286269 A1 | 10/2017 | Furman et al. |
| 2017/0293681 A1 | 10/2017 | Blandin et al. |
| 2017/0293834 A1* | 10/2017 | Raison .................. G06N 3/006 |
| 2017/0295114 A1 | 10/2017 | Goldberg et al. |
| 2018/0324120 A1 | 11/2018 | Smullen |
| 2018/0331979 A1 | 11/2018 | Rakovitsky et al. |

OTHER PUBLICATIONS

Office Action for U.S. Appl. No. 15/590,791, dated May 1, 2019, Rakovitsky et al, "System and Method for Creating Conversations to Launch Within Applications", 23 pages.

* cited by examiner

| INSTABOT | CONVERSATIONS | | | | |
|---|---|---|---|---|---|
| ⊙ SEARCH FOR CONVERSATION | | STATUS ▾ | XXX 01-31, YYYY ▾ | | NEW CONVERSATION |
| | | | SEARCH CLEAR | | |
| ☐ CONVERSATION NAME | INITIAL QUESTION | ENGAGEMENT RATE | DEPLOY RATE | STATUS |
| ☐ NEW USERS | WERE YOU REFERRED HERE BY A FRIEND? | 35.5% - 142 / 400 | XX/01/YYYY 3:54 AM | ACTIVE |
| ☐ SUMMER2016 | DO YOU WANT TO SEE OUR ITEMS ON SALE? | 71.1% - 189 / 266 | XX/01/YYYY 4:24 PM | ACTIVE |
| ☐ FAVORITE MUSIC | WHICH MUSICIAN DO YOU PREFER? | 9.0% - 36 / 400 | XX/01/YYYY 3:29 AM | ACTIVE |
| ☐ SPRING SALE 2016 | DO YOU WANT TO SEE OUR ITEMS ON SALE? | 62.2% - 280 / 450 | XX/01/YYYY 4:28 AM | ACTIVE |
| ☐ VALENTINES16 | INTERESTED IN GETTING SOMETHING FOR YOU LOVE? | | | DRAFT |
| ☐ TOPDESTINATIONS | WOULD YOU LIKE A BEACH OR ADVENTURE VACATION? | 5.0% - 15 / 300 | XX/01/YYYY 4:32 PM | ACTIVE |
| ☐ PRIMEDAY2016 | HAPPY PRIME DAY! WOULD YOU LIKE TO SEE OUR PRIME DEALS? | 67.1% - 200 / 298 | XX/01/YYYY 4:32 PM | ACTIVE |

FIG. 7

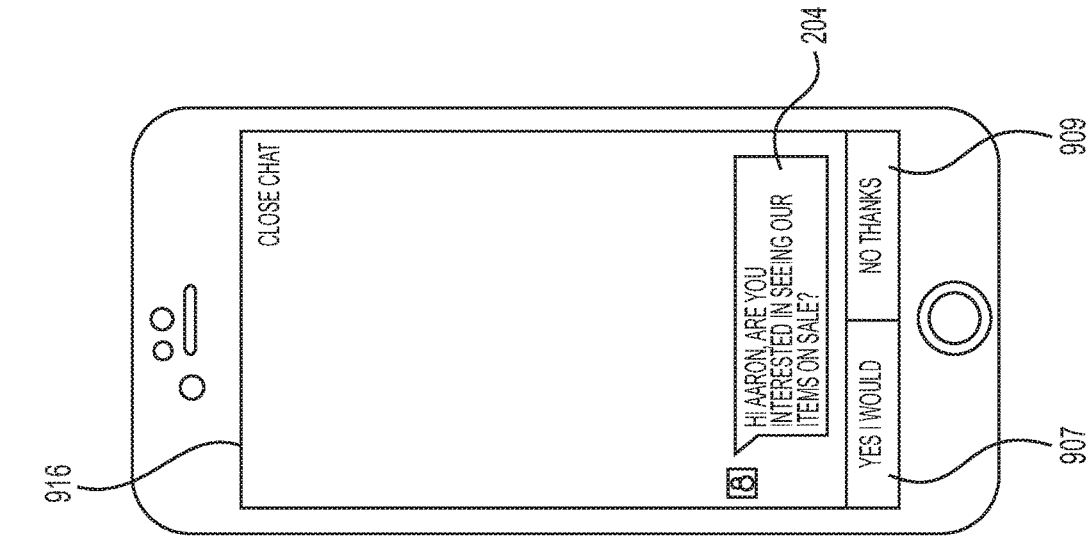
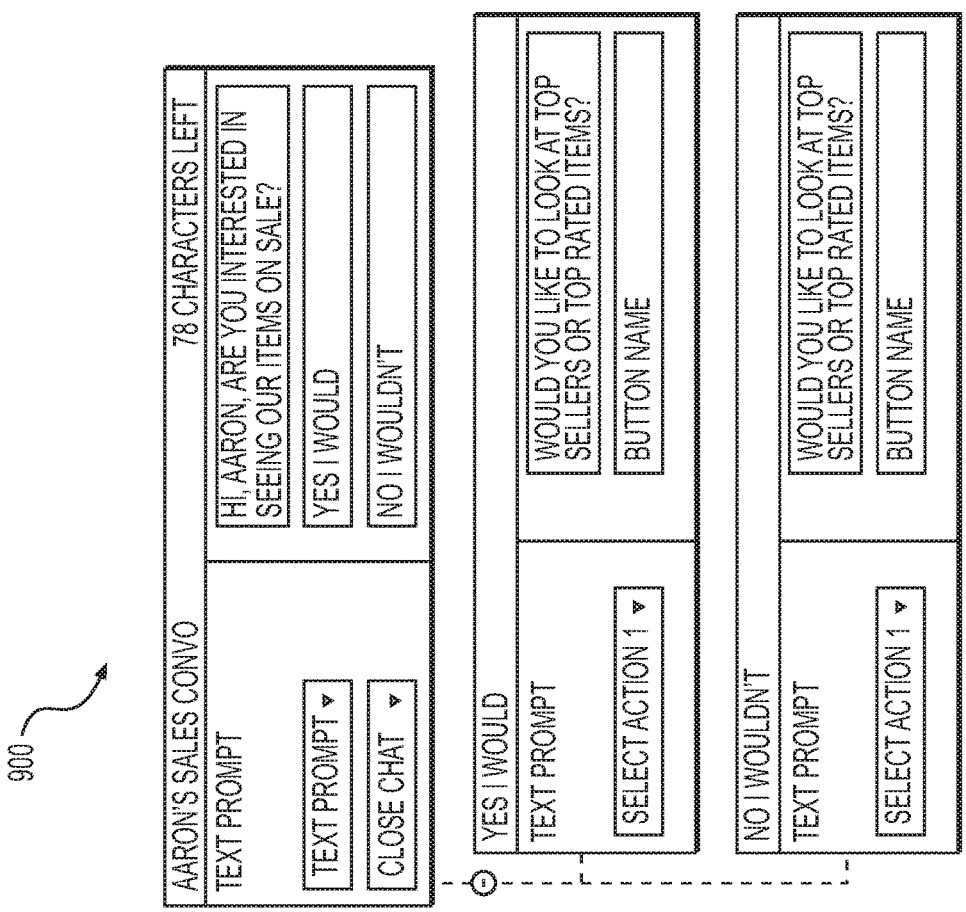
FIG. 9G

SYSTEM AND METHOD FOR GENERATING ANALYTICS FOR CONVERSATIONS WITHIN APPLICATIONS

This Application is related to U.S. patent application Ser. No. 15/590,791 entitled "A System and Method for Creating Conversations to Launch Within Applications," which was filed May 9, 2017.

BACKGROUND

Applications provide basic operations for users of the applications. In addition to such basic operations, users can be provided with additional interactions. Application development tools, including those used in mobile applications, can allow developers to produce applications that support additional interactions, referred to as conversations, with the users of applications. The data generated by these conversations are valuable to the application user and developers. The location and structure of the processing that enables these conversations also impacts the load on, and efficiency of, one or more servers or other components supporting the application developer, the platform for supporting the applications and developing the conversations, and/or the mobile devices, web platforms or other applications in which the conversation can be launched. As such, there is a need to improve the content, configuration and processing location associated with the conversations. Because the data resulting from the conversations can also impact the value and use of the conversations, there is a need to improve the processing and the use of the data.

BRIEF DESCRIPTION OF THE DRAWINGS

FIG. 7 is an illustrative computing environment including an illustrative user interface for an application developer to manage conversations.

FIG. 9G is an illustrative computing environment including an illustrative portion of the FIG. 2 user interface for an application developer to create a conversation and to receive a display as a preview of a user interface of an application on which the conversation is launched.

DETAILED DESCRIPTION

Figure 1:
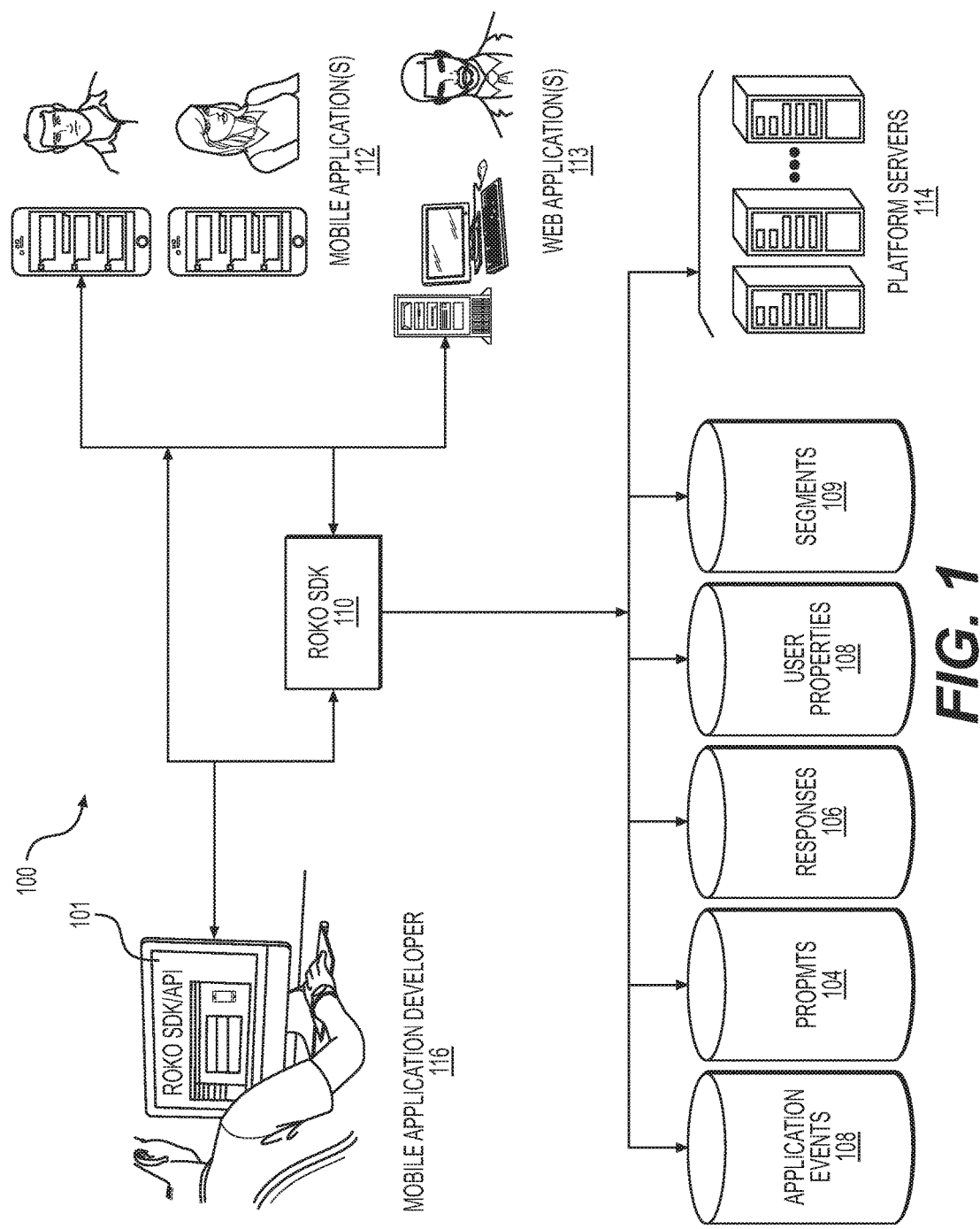
FIG. 1 is a schematic diagram of an illustrative computing environment useable to create additional interactions, in the form of conversations, for launch in applications.

This disclosure is directed to a system and method of creating conversations for launch within applications and generating analytics based on the data received from the users of the applications in response to the conversations.

One example of the invention includes a platform to enable application developers to create one or more interactive conversation(s) for users of the applications. In one example, a conversation can be generated using a mobile-compatible or web-compatible software development kit, or SDK (for example, commercially available from ROKO™ Labs LLC, referred to herein as "ROKO"). The conversation can be incorporated into the SDK (referred to as "ROKO SDK" herein). ROKO also can provide an application programming interface, or API (also referred to as a "ROKO SDK/API"), for use by an application developer in order to create the conversation.

The conversation can be developed and launched using the ROKO SDK for integration into one or more applications created by application developers for mobile devices, web platforms, as well as other technology environments supporting applications. The conversation can support interactions with users of the applications based on the accumulation of data entered or selected by the users. The data can be received by the ROKO SDK and assessed, in order to provide analytics about user's input or feedback to the conversations. In another example of the invention, the data can be received by the ROKO SDK and assessed to direct the user experience with the application into paths based on the content of the conversation.

In one example, the ROKO SDK/API can include user interfaces for application developers to create one or more conversations and to configure the conversations for launch to one or more applications. The conversations can be launched based on any number of indications, including opening the application, a specific time within operations of the applications, a particular page within an application, a delay in user interaction or any number of other events or triggers for the conversations (generally referred to as indications). In additional examples of indications for the launch of the conversation, a launch can be based on characteristics of the user of the application, including an assessment of the profile of the user in order to identify one or more user properties and/or segments associated with the user profile. The conversation can then be triggered based on a determination of whether the user engaged with the application is associated with a user property or a segment associated with the conversation. For example, one conversation can be targeted for a segment of application users who have downloaded only a trial version of a particular product or service associated with the application. Thus, when an application user belonging to a trial application user segment opens the application and the ROKO SDK identifies the application user as a member of that user segment, the ROKO SDK can trigger the deployment of the corresponding conversation for the user. In other examples, users interactions with the conversation can prompt new user properties and/or segments, which can then be used for future launches of subsequent conversations. The scope of the invention includes a variety of indications for launching conversations.

The conversation, in one example of the invention, can comprise a series of data, such as for example, prompts (such as, in the form of questions or statements), responses, actions based on the prompts or earlier responses and other data entry or selection options with which the users of the application can engage, as well as actions to redirect the conversation to other locations within the application, or outside of the application to another application or other technology environment, application etc. or to close the conversation by triggering a close action or abandoning the application. The conversations also can include additional content, including textual, visual, audio and/or video material, as well as data which is entered, selected, or generated such as binary or multiple selection responses, artificial intelligence generated data, natural language processing generated data, free-form data, customized data or other forms of content which can be associated with the users of applications during conversations.

Prompts, responses and actions for conversations are now further described below. In one example, a prompt can be a question, notification, information, or link (for example, a universal record locator or "URL," a web address or another Internet address, link or alias which specify a location on a computer or other network) provided by the application developer for mobile application or web platform users in various forms. Several non-limiting examples are text-based (for example, "Hello, how are you?"), links such as a URL, or an action button (such as "Close app" button) entered or selected by the application developer as an input to the ROKO SDK/API during the creation of a conversation. A prompt also can refer to an action generated by the conversation that can initiate an action from or by the application user such as providing a response to a question or pressing a link button in the application during a conversation. In addition, a response can refer to texts, links, symbols, icons, and other information that an application developer enters during the creation of a conversation. A response also can refer to a response selectable, selected, or inputted by an application user as a result of at least one prompt generated by the conversation. The term response further can refer to a process or an action by an application user in which an application user inputs or triggers data or selects a provided one or more pieces of data by the application user to a prompt presented by the conversation. A response can be selected by the application user by clicking on or selecting at least one desired answer or action button provided during a conversation. A close action can include data entry, selection, other interaction based on options provided by the conversation, such as closing the conversation or transitioning to another location within the application or outside the application in which the conversation appears, or a time-out process during which there is no activity by the application user, which can then result in terminating the conversation or, alternatively, requesting further action or confirming the present status, among other functions which can be implemented. While these examples of prompts, responses and close actions from the creation of conversations, additional approaches to providing data entry and the receipt of data also are within the scope of the invention. For example, based on responses or selections to questions, one or more follow-up questions can be included in the conversations. User responses can be received by the ROKO SDK and assessed to produce individual user, prompt, response, data, action and/or aggregations of any of these features in the form of analytics. The analytics can then be presented to the application developers through the ROKO SDK/API user interfaces or to the ROKO SDK and broader ROKO module for use with other ROKO applications which can be leveraged by the mobile or web platform application developer as well (not shown; a module can be provided to the application developer including additional SDKs and other application developer supporting hardware and software components, which can similarly produce data and analytics which can then be leveraged in the ROKO SDK for conversations, as one example), as well as to third-party systems, such as a CRM system.

In one example, an additional advantage of the ROKO SDK/API and the ROKO SDK in that a portion or the full processing of any hardware, software and/or a combination of hardware and software components or portions of the processing, such as the creation of conversations, analysis of the collected data, and/or other processes that are computationally intensive, can be performed on a variety of hardware and/or software resources. Since the ROKO SDK supports portions of processing in a distributed network approach, computationally intensive processing need not be executed entirely on the mobile user's device or by the server(s) and processor(s) associated with the web platform or other environments in which the conversation is launched, but portions of the processing are performed on one of the ROKO SDK or broader ROKO application servers as well as other servers, such as the mobile or web platform application developers server(s) which are remote from the mobile or web platform application(s). Portions of the processing can also be distributed to applications or servers with portions or all the processing components being remote from each other. In addition, processing loads can be distributed across several of the ROKO SDK servers and/or the application developers' process servers that can run the ROKO SDK/API and/or the SDK conversations. Processing loads can also be distributed to other servers that run the application developer's platform, either independently, or in conjunction, with the ROKO SDK servers. In this example, the application processing load on the mobile device or web platform can be reduced, thus allowing the application user to interact with the application closer to real-time, making interactions more enjoyable and encouraging extended user engagement with the conversation and the application. By distributing the processing load to the one or more platform server(s), the data processing, collection, sorting, filtering, analysis, and storage associated with the conversations can be more effectively managed. Thus, the ROKO SDK, ROKO SDK/API, application developer or third-party server(s) can, for example, collect conversation data and perform analytics approximating real-time while multiple application users are simultaneously engaged in conversations. The impact can be an overall reduction in processing loads at any one server associated with the creation of the conversation, processing of the conversations or the analytics associated with the conversation.

Based on trends observed in real-time regarding application users' behaviors and actions (for example, for predetermined responses and the number of interactions within the conversations that users engage in), the ROKO SDK can receive the responsive data and use it to suggest edits to the conversation and content that encourages further engagement by the application user. With approximately real-time analytics, the ROKO SDK, as well as the application developer through the ROKO SDK/API, based on feedback analytics from the execution of the conversation, or even automated edits to the conversations based on artificial intelligence or other semi-automated or fully automated editing, can occur in order to adapt the conversation in a proactive and/or responsive manner to address apparent or potential opportunities for enhancing the mobile or web platform users' successful intersections, as well as issues that might diminish interest or engagement by users with the applications.

In combination with the ROKO SDK analytics, application developers can use the ROKO SDK/API platform to provide conversation structure and content that is refined or focused to address the needs of particular users more effectively; for example, by focusing on user properties, or segments (as discussed above). For example, depending on the observed trends relating to conversations derived from analytics data, the ROKO SDK can suggest adjustments to existing conversations or new conversations to the application developers. Continuing with this example, the ROKO SDK/API can provide data or make suggestions to inform application developers about how subsequent conversations for the same user segment can be designed to more effectively identify the users' interests and align them with those of the application.

The examples provided herein illustrate additive benefits and opportunities based on using platforms such as the ROKO SDK/API, the ROKO SDK and other components of the ROKO platform and, along with the examples discussed in connection with the figures below, can be implemented in various ways to create conversations, generate analytics and apply the analytics to improve the conversations and the applications in which the conversations are launched. No individual example provided in this application is intended to limit the scope of the invention.

Figure 2:
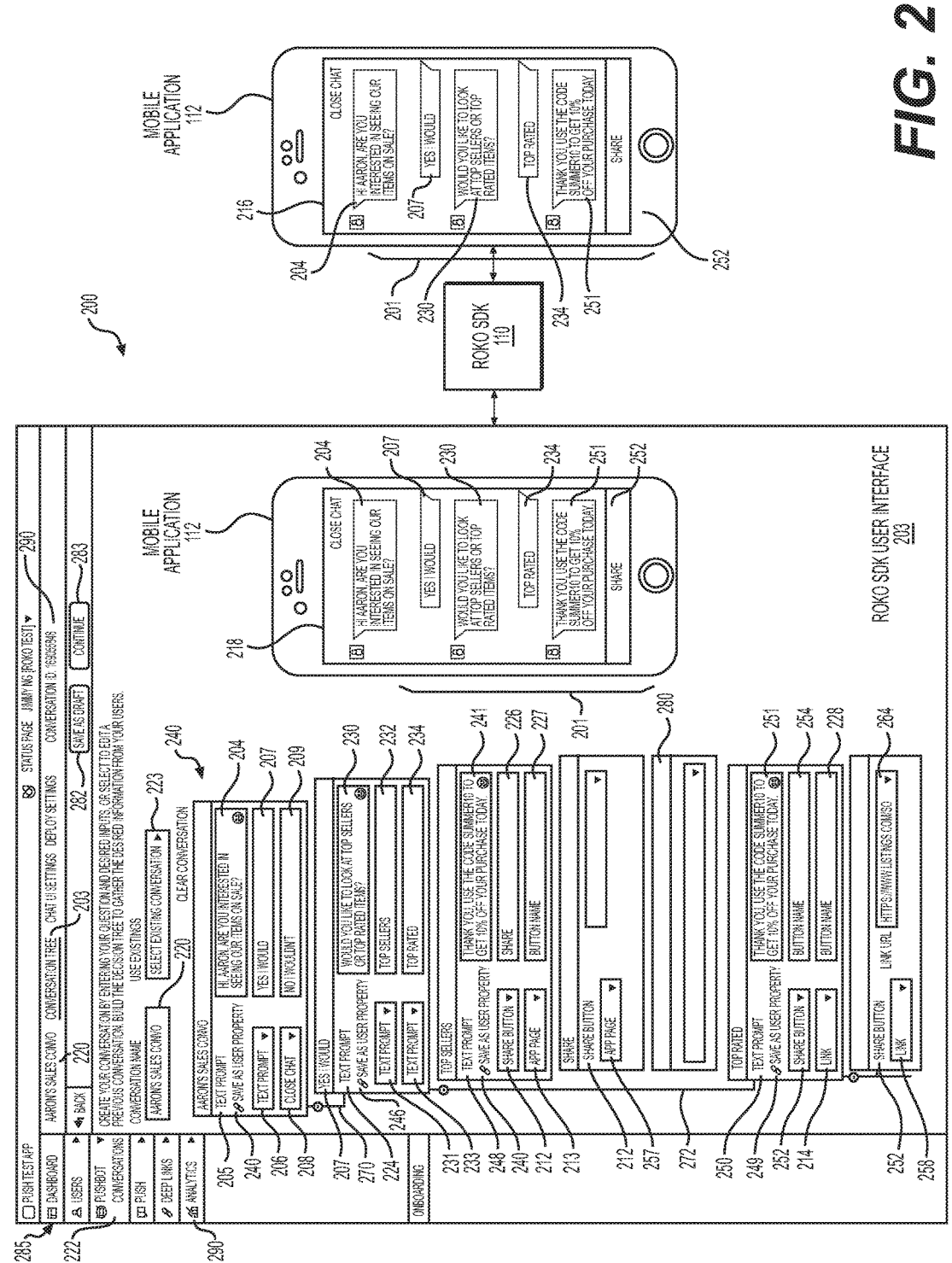
FIG. 2 is an illustrative computing environment including illustrative user interface displays for a mobile application developer and/or a user of a mobile application.

FIG. 1 is a schematic diagram of an illustrative computing environment 100 including a ROKO SDK 110 useable to create conversations (as shown in FIG. 2, conversation(s) 201 for launch in applications 112 and 113. The applications 112 and 113 can including mobile applications 112 and web platform applications 113d, as examples. The ROKO SDK 110 can provide user interfaces, or UIs, 101 (herein referred to as "ROKO SDK/API user interface(s), or UI(s), 101") for an application developer 116 to interact with the ROKO SDK 110 in order to create conversations 201. The ROKO SDK 110 can communicate with both the application developer 116 and applications 112 and 113. In this example, two instances of mobile device applications 112 and one instance of an application 113 on a web platform are shown, with related users (shown pictorially) of those applications 112 and 113. When the application developer 116 completes the creation of a conversation 201, the ROKO SDK 110 configures the conversation 201 for launch in the applications 112 or 113. For illustration purposes only, the remaining figures of this invention present mobile applications 112 in which the conversation 201 is launched and operated. However, in alternative examples in which applications on web platforms 113 are used, conversations 201 can be launched and operated on user interfaces of web platforms 113, as well as other hardware, software and/or UIs or other components of a variety of applications in other technology environments, as a variety of technology environments are within the scope of the invention.

The ROKO SDK 110 also performs various other tasks, such as in this example, communicating with one or more databases to store, access and output the content and activities for configuring the conversations 201 in the ROKO SDK 110. For example, the ROKO SDK 110 stores data in and retrieves it from one or more databases comprising Application Events 102, Prompts 104, Responses 106, User Properties 108 and Segments 109, for use in creating conversations 201 or generating or applying analytics derived from the conversations 201 being launched in applications 112 or 113, as well as for potentially other uses in the applications 112 and 113, such as assigning user properties to user profiles and creating segments based on the user properties and/or other data in addition to the user properties. One or more platform server(s) 114 can support this processing. The ROKO SDK 110 also can execute data analytics processing, receiving data, including selections and other input, entered by users of the applications 112 or 113 and assessing the received data to provide analytics for the conversations 201. Mobile devices supporting the applications 112 or 113 can be operated on a variety of different operating systems such as iOS, Android, or Windows Mobile, etc., to name a few examples. Web platforms supporting applications 113 can be operated on a variety of different operating systems such as Microsoft Windows, Apple OS X, Linus, Chrome, Firefox, Safari etc., to name a few examples. A variety of operating systems, including hardware and/or software components supporting the applications, or other computer applications or technology platforms or environments in which the conversations appear are within the scope of the instant claims and invention.

While the servers 114 are shown for illustrative purposes in FIG. 1, the processing can be implemented in several environments thus the use of platform server(s) 114 is optional. More particularly, the processing environment used to register mobile devices, web platforms or other environments or platforms which host conversations 201, to send push messages, to conduct conversations 201, to view analytics, and to store analytics events can vary depending upon the desired implementation of these processes. For example, the processing can occur in any number of environments such as a cloud environment (not shown), servers 114 or other processing environment. Files containing the conversations 201, events 102, prompts 104, responses 106, and related components and/or data from the conversations 201 can be received at the local browser of the application developer 116 (also referred to as a client site) for processing by the ROKO SDK 110.

Figure 4:
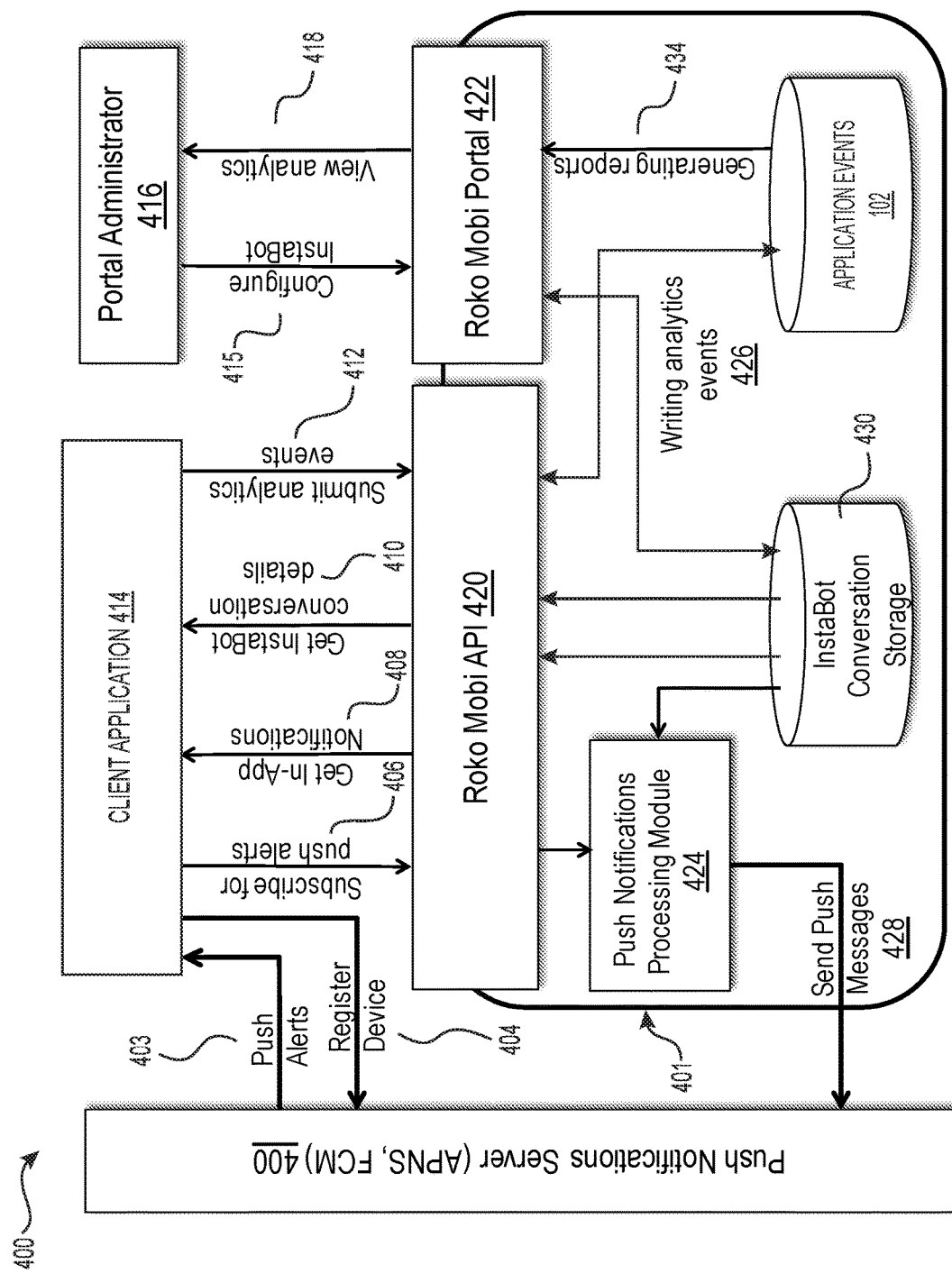
FIG. 4 is a block diagram of data transmissions and components of the system for the illustrative computing environment.
Figure 5:
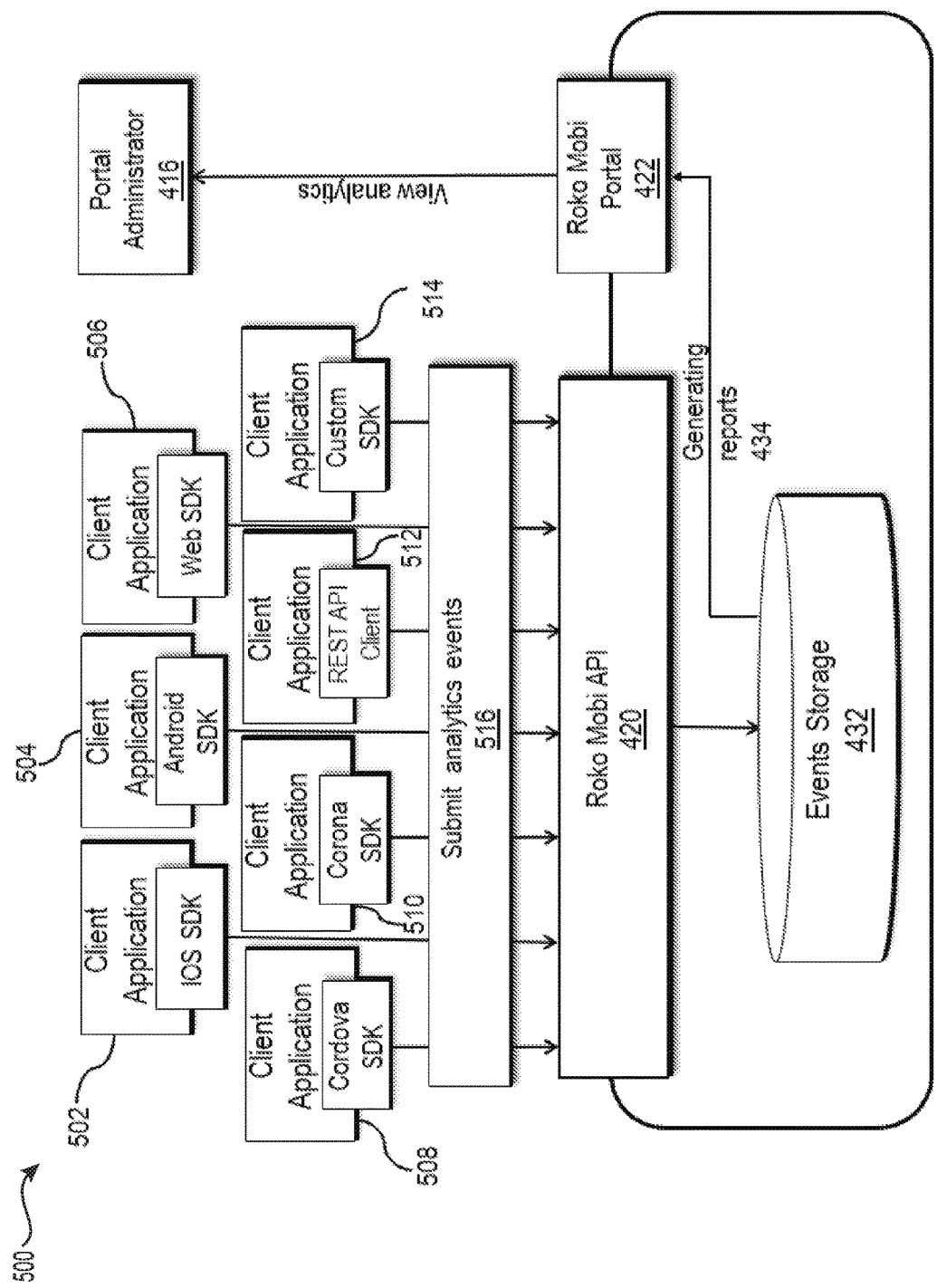
FIG. 5 is a block diagram of an analytics engine component of the system for the illustrative computing environment, showing components of the analytics engine that communicate to assess the data received from the conversations.

The computing architecture shown, for example, in FIGS. 1, 4, and 5 can include one or more processors 114 and one or more computer-readable media that store various modules, applications, programs, or other data. The computer-readable media can include instructions that, when executed by one or more processors, cause the processors to perform the operations described herein. The one or more processors, referred to in the previous example may include any suitable type of processor including, without limitation, central processing units or graphics processing units.

Implementations also can be provided as a computer program product including a non-transitory machine-readable storage medium having stored instructions thereon (in compressed or uncompressed form) that can be used to program a computer (or other electronic device) to perform processes or methods described herein. The machine-readable storage medium can include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, examples can also be provided as a computer program product including a non-transitory or transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. In addition, system memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the carrier servers.

FIG. 2 illustrates a diagram 200 showing the ROKO SDK/API UI 203 (also referred to as the UI 203) generated by the ROKO SDK 110 and illustrative application user interfaces 216 and 218 for an exemplary conversation 201 associated with an application 112. In this example, the application developer 116 can use the UI 203 to create a new conversation 201 by selecting the top option "InstaBot Conversations" 222 on the left-hand column bar menu and inputting and selecting data in a format of a conversation. The conversation 201 can be built by a range of data entry or selection techniques including data entry, selection, input, editing, retrieval of data in text, visual, audio, video or a combination of multiple approaches to data entry or selection, including referencing URLs or links of pages within the application 112 in which the conversation 201 is launched or data for redirection or connection to other applications or technology platforms, including other applications 112 by the same mobile application developer 116, ROKO platform tools or third-party applications. A variety of data entry, selection and generation approaches including text, visual, audio and visual are within the scope of this invention.

The UI 203 of FIG. 2 provides an example of the creation of a conversation 201 in a conversation tree 210 approach based on entering text corresponding to prompts and/or inputs from a set of existing options, by selecting or entering data into data field boxes or by retrieving and editing a previously created or stored conversation 201 for use or further editing. In this manner, pre-existing conversations 201 also can be edited from the UI 203. As the conversation 201 is being formed, it is displayed on the display screen 218 of application 112 in a form in which it will be viewable by a user of the mobile application 112.

The ROKO SDK/API UI 203 displays a conversation tree 210 having several tiers (also referred to as a first-tier or Tier 1, a second-tier or Tier 2, a third-tier or Tier 3 etc., a series of levels or branches) of the conversation 201. Each tier can include prompts 104 and responses 106, as well as other components, for the user of the conversation to engage with during the conversation after launch. The mobile application user develops these tiers 116 by continuing to build additional conversation components, such as additional prompts and responses, as well as other components, for the user of the conversation 201 to engage with during the launched conversation 201. On this exemplary UI 203, upon activating the option "InstaBot Conversations" 222, a page labeled "Aaron's Sales Convo" 226 is opened. Once the UI 203 opens, the application developer 116 (not shown) can select one of several options, including the "Conversation Tree" option 202. As a result, the application developer is presented with the "Conversation Tree" 210, which displays the conversation tree with tiers (each represented by a window with a header bar showing a header or title that identifies the particular tier or branch of the conversation tree). Each tier or branch of the conversation tree 210 is activated by the mobile application developer 116 adding another section of a prompt 104 and one or more responses 106. The UI 203 also provides a "Conversation Name" box 220 for entering a name for a conversation 201 when creating a new conversation 201. As shown, the conversation name "Aaron's Sales Convo" also appears in the conversation name box 220, and it is the name of an existing conversation 201 (also shown by the selected option "Select Existing Conversation" in the "Use Existing" box 223). The previous example represents two possible scenarios as for forming the conversation 201. One scenario represents a situation in which the application developer 116 is using a previously stored conversation to create a new conversation 201. Another scenario involves a situation in which the application developer 116 continues to edit the conversation 201 "Aaron's Sales Convo", which was previously created and stored, but is still unfinished.

The conversation tree branches can be created, for example, by inputting or selecting data for a first data entry box 204 corresponding to a first prompt 204, associated with a Text Prompt field 205, for the conversation 201. In this example, the data entered in the data entry box 204 is "Hi (Username), are you interested in seeing our items on sale?" is the first prompt 204. The data entered into the box 204 can be displayed as the first prompt 204 in the conversation 201 on display 216 of the mobile application 112 and as shown in the preview display 218 of UI 203. In one example, the first prompt 204 can be in the form of a text prompt (such as a declaratory statement or a question) with one response associated with the text prompt. In the FIG. 2 example, the first prompt 204 is shown with two options for responses. For each of the responses, in one example, a button with a drop-down option list can be shown to provide the mobile application developer 116 with selections for the type of responses. The conversation 201 depicted in FIG. 2 shows an example of a variety of response types, including another text prompt shown as a Text Prompt 206 selection, a Close Chat 208 selection, a Share Button 212 selection, an App Page 213 selection and Link 214 selection, as well as multiple additional instances of these selections in the FIG. 2 example.

For prompt 104 and responses 105 generally, including the buttons associated with the responses, such as the Text Prompt 205 selection and Text Prompt 224 selection, the Close Chat 208 selection, an App Page 213 selection and a Share 212 selection or a Link 214 selection, there can be data entry boxes for entering text associated with some of the selections, such as the data entry box 204 associated with the Text Prompt button 205, the data entry box 209 associated with the Close Chat 208 selection, the data entry box 226 associated with the Share Button 212 selection, the data entry box 227 associated with the App Page 213 selection and the data entry box 228 associated with the Link 214 selection. In some instances, in this example, the data entry boxes accommodate the data of a text entry, such as boxes 204, 207, 209. In other instances, the selection of responses, such as the Share 205 selection, can expand a new branch of the conversation tree 210 in order to allow a link to be selected from a drop-down box or otherwise identified by a variety of input options to identify links or URL data.

The prompt, specifically, the first prompt 204 within the first-tier of the conversation 201 is now described. For example, the conversation 201 of FIG. 2 is triggered by the first prompt 204 as a Text Prompt 205 selection. The Text Prompt 205 selection has a data entry box to receive data as input for display on the mobile application 112 display 216. The data shown in the Text Prompt 205 selection is "HI Aaron, are you interested in seeing our items on sale?" 204, as is also shown on the displays 216 and 218. The first prompt 204 associated with the Text Prompt 205 selection includes two responses 207 and 209, associated with two selection options 206 and 208, respectively, in this example. Further, the mobile application developer 116 selected for the first response 207, another Text Prompt 206 selection and for the second response 209, a Close Chat 208 selection. Each of the first and second responses 207 and 209 have data entry boxes to receive data. In this example, the data shown in the first response 207 is "Yes, I would" 207 and the data shown in the second response 209 is "No I wouldn't" 209. In the preview of the display 216, it is assumed that the user of the mobile device 112 selects the first response 207, as the response "Yes, I would" 207 is shown. If the second response 209 had been selected by the user of the application 112, then the Close Chat 208 functionality can be activated, triggering closing the conversation.

The conversation 201 shown in FIG. 2 then continues with the Text Prompt 206 selection "Yes, I would" 207, at which time this selection 207 then becomes a second prompt 230 for the conversation 201. The second prompt 230 is associated with a Text Prompt 224 selection. The data entry box for the second prompt 230 states "Would you like to look at top sellers or top rated items?" 230. The data entry for the second prompt also is shown on the display 218 as a preview of conversation 201 and on the display 216 as a portion of the actual conversation 201. In this exemplary conversation 201, the Text Prompt 206 triggers two additional responses 232 and 234 shown as options for the mobile developer 116. In other examples, a single response or multiple responses can be made available for prompts, as well as a single response being made available with an option to add another response upon completion of an earlier response, so that the application developer 116 can determine whether to add further responses upon the completion of each response rather than selecting the number of responses at the outset of identifying a new prompt. The third response 232 (labeled for ease of reference as the third response 232 in the conversation given that the first and second responses 207 and 209, respectively, are associated with the first prompt 204) data box entry is "Top Sellers" 232 and the fourth response 234 also is associated with a Text Prompt 233 selection and has a data box entry containing the input, "Top Rated" 234. In the preview of the display 218, it is assumed that the user of the mobile device 112 selects the fourth response 234, as the response "Top Rated" 234 is shown. Similarly, where this conversation 201 is launched on a mobile device 112 and the user selects also selects the "Top Rated" 232 selection, then the data "Top Rated" 234 also would be shown on display 216. If the third response 224 had been selected, then the "Top Sellers" 232 data would have been shown on the displays 218 and 216. In addition, the preview display 218 can show changes to the conversation 201 as the application developer 116 is manipulating the UI 203 to select various buttons, such as for example, buttons 206, 208, 231, 233, 213, 252, 258 etc. In this way, the application developer 116 can preview the conversation on the display 218 as he or she is creating it. Display 216 then presents the conversation 201 in its final form after launch of the conversation 201.

An additional prompt in the conversation 201, referred to as a third prompt 241, (noting that where the second response 209 was selected to be a text prompt, additional sets of responses would have been created, and in that tier of the conversation 201, another third prompt would have been created, therefore, the third prompt 241 is used for ease of reference but the actual third prompt of the conversation 201 depends in part on the selection of responses by the user and therefore which branch of the tree the conversation 201 is directed to). The third prompt 241 of conversation 201 relates to the 'Top Sellers" and third response 232 and is associated with a Text Prompt 248 with the data entry 241 "Thank you, use this code SUMMER10 to use 10% off of your purchase today" 241. The fourth prompt 250 of conversation 201 relates to the 'Top Rated" and fourth response 234 and is another Text Prompt 250 with the same data entry "Thank you, use this code SUMMER10 to use 10% off of your purchase today" 251 as the third response 232 and third prompt 240. The data entry for the Top Rated 234 is shown on display 218 as a preview, and assuming a mobile device user also selects "Top Rated," the same data entry is shown on display 216 or "Thank you, use this code SUMMER10 to use 10% off of your purchase today" 251. In addition, the Text Prompt 250 selection also demonstrates another feature of the conversation 201 as presented to the user of the mobile application 112 in that the Share Button 212 data of "Share" 226 is displayed for the user on the display 216 and on the preview display 218 as the approach by which the user can make the selection of the Share Button. As further shown in FIG. 9G on the display 916, the response options for each prompt can be shown on the bottom of the display 916 such as, for example, the "Yes, I would" first response 207 or the "No, I wouldn't" second response 209 with the response selected by the user of the mobile application 112 triggering the next step of the conversation 201. Returning to the FIG. 2 example, the Share selection 226 will then prompt the ROKO SDK 110 to execute the Share Button 212 and the further instructions entered by the mobile application developer 116 as to the App Page 257 selection to which to direct the conversation 201.

The remaining UI 203 selections and data entries in this example do not result in a change to the display 216 shown to the mobile application 112 user. However, the responses to the third and fourth prompts 241 and 251 include actions associated with the conversation 201 data, such as for example, supporting the user of the mobile application 112 to receive a 10% discount, or other actions which may relate to or derive from the conversation 201. More specifically, the third prompt 241 associated with the Text Prompt 240 has two responses associated with either a Share Button 212 selection or a data entry 226 for the 212 selection. This action enables the conversation to share data with another page or area of the application 112 in which the conversation 201 is launched or another application as related to the objective of the conversation 201. In this example, the Share Button 212 selection also triggers another prompt for more data about the Share Button 212 selection, with another opportunity for the mobile application developer 116 to determine the way the conversation 201 will be shared, including an App Page 257 selection. Another response for the third prompt 241 is an App Page 213 selection and a data entry 227 for the 213 selection. The App Page action, such as the 257 or 213 selections, enables the conversation 201 to redirect the user to a page of the application 112 in which the conversation 201 is launched or another application as related to the objective of the conversation 201.

The fourth prompt 251 associated with the Text Prompt 250 has two responses associated with either a Share Button 252 selection or a data entry 254 for the 252 selection. The action described previously enables the conversation to share data with another page or area of the application 112 in which the conversation 201 is launched or another application as related to the objective of the conversation 201. In this example, the Share Button 252 selection also triggers another prompt for more data about the Share Button 252 selection, with another opportunity for the mobile application developer 116 to determine the way the conversation 201 will be shared, including the Link 214 selection and the data entry 228 for the 214 selection.

In this example, Share Button 252 selection also triggers another prompt for more data about the Share Button 252 selection, with another opportunity for the mobile application developer 116 to determine the way the conversation 201 will be shared, including a Link 258 selection and a data entry 264 showing a URL associated with the Link 258 selection. The Link selections 214 and 258 enable the conversation 201 to redirect the user to a link or URL which can be associated with the application 112 in which the conversation 201 is launched or another application.

In this exemplary conversation, a text prompt triggers two additional responses shown as options for the mobile developer 116. In other examples, a single response or multiple responses can be made available as a result of a prompt, including a text prompt or other forms of data for prompts, including visual, audio, video or other forms of data or notifications, as well as a single response being made available with an option to add another response upon completion of an earlier response, so that the mobile application developer 116 can determine whether to add further responses upon the completion of each response rather than selecting the number of response at the outset of identifying a new prompt.

As an example, for each of the prompts, the first prompt 204, the responses, e.g., the first response 207 and the second response 209, are linked to their respective prompts, e.g., the first prompt 204. The third and fourth responses 232 and 234, respectively, are linked to the second prompt 230. In addition, the UI 203 data entry selections and data entry boxes can be shown in a linked manner, such as, for example, the text prompt 207 is linked to the first response 207. In addition, in this example of UI 203, line connectors 270 and 272 are shown, which include a circled minus icon for minimizing a branch (i.e., to make a branch disappear from view) thus providing another visual indication of the relationship between prompts and responses. In this example, visual links are shown between prompts and responses, including further prompts 241 and 251 and their respective responses, such as for prompt 241, response 226 and 227 and for prompt 251, responses 254 and 228. However, visual links need not be provided in UI 203.

The user property 240 selection is now described. For each prompt, such as prompts 204, 230, 241 and 251 (to provide examples of a few prompts in FIG. 2), the selection of one of the responses for each prompt can be saved as a user property 240 for the user of the mobile application 112 who is interacting with the conversation. User property options are shown as 'Save as User Property" 240, 246, 248 and 249 and are associated with prompts 204, 230, 241 and 251, respectively. Based on the user's selection of a response to a prompt, the user property can be added to the user's user profile (not shown) and the conversation 201 can therefore support not only data from a user about the conversation data presented and targeted, but also the data selected by the user can be added to the user profile for uses beyond that conversation, including for example, demographics, and even likes and dislikes. One example of such a use involves relating segments to user properties, for example, in a scenario where the user does not use the sale code by selecting the Share Button 252 link, then the user is not positively disposed to purchasing based on a sales coupon. User property 249 can then be associated with the user, then, when a future conversation 201 is being created and the factor of targeting users interested in seeing sale items is an objective, the conversation 201 can include an automated filter applied to the user profiles for the segment of users with the desired user property as a basis to launch the conversation 201. Therefore, the "Save as User Property" 240 selection can provide an additional functionality to conversations 201 and richer data for uses beyond the conversation 201 immediate interactions with the user.

The source of the data for prompts 102 and responses 104, as well as user properties 108 and the segments 109, can be the databases shown in FIG. 1, including the prompts 104, the responses 106, the user properties 108 and the segments 109. The processing by the ROKO SDK 110 to support creation of the conversations 201 on the ROKO SDK/API 101 can be supported by platform servers 114. The results of entries made by the application developer 116 can be previewed through a depiction of a user interface 218 of the application 112 on the ROKO SDK/API UI 203. Once the data inputs and selections to construct a new conversation 201 are created, the conversation 201 can be configured to launch from the ROKO SDK 110 to the application 112. The preview 218 can be updated as the application developer 116 creates or edits the conversation 201. As the conversation tree grows larger, the ROKO SDK/API UI 203 can scroll so that the preview and send buttons remain visible (scrolling not shown).

The UI 203 is now further described. In one example of the ROKO SDK/API UI 203 in FIG. 2, a combination of prompts and responses can be contained in a visual box representing a branch of the conversation tree 210, such as the visual box including the first prompt 204, the first response 207 and the second response 209 (also presented as the data contained in their respective data entry boxes 204, 207 and 209). When the mobile application developer 116 is interacting with each visual box on the UI 203, the box can be highlighted (not shown) to present the current branch of the conversation 201 in which the mobile application developer 116 is working. While the mobile application developer 116 is engaged with the UI 203, the display 218 can preview possible user inputs, and ROKO SDK 110 can respond based on that selected input box to update the display 218 on the ROKO SDK/API UI 203. For example, in the illustration of FIG. 2, the first prompt 204 associated with the Text Prompt 206 selection is currently selected. Therefore, the preview display 218 can show one potential path for a selection by the user of the mobile application 112 of "Yes I would" based on the potential subsequent selections of "Would you like to look at top sellers or top rated items"; "Top Rated"; "Thank you, use the code Summer10 to get 10% off your purchase today." If the mobile application developer 116 selects for preview purposes in the UI 203, the "Top Sellers" input box, then the preview display 218 would show "Yes I would"; "Would you like to look at top sellers or top rated items"; "Top Sellers"; "Thank you, use the code Summer10 to get 10% off your purchase today."

The use of tiers, prompts 102 and responses 104 is now further described. In one example, a conversation 201 can comprise a predetermined number of tiers, such as a maximum of three tiers where (as shown in FIG. 2) the first-tier (also referred to as "Tier 1" in the figures, including FIGS. 13-14) is represented by the first prompt 204, the second-tier is (also referred to as "Tier 2" in FIGS. 13-14) is represented by the second prompt 230 and the third-tier (also referred to as "Tier 3" in FIGS. 13-14) is represented by the third prompt 241, including either the third response 232 or the fourth response 234 as alternative selections. Additionally, for each of Tier 1, Tier 2 and Tier 3, there can be one or more responses (also referred to as "Response 1" "Response 2" and "Another Response" in FIGS. 13-14; for the exemplary conversation, two responses are shown per tier. However, in other examples, there can be more than two responses, an unlimited number of responses or a predetermined maximum assigned to the conversation 201 as implemented in additional examples of the ROKO SDK 110). Responses are referred to alternatively as Response 1, Response 2 etc. for each of Tier 1, Tier 2 and Tier 3 (as shown in FIGS. 13-14) or as a first prompt associated with first and second responses, a second prompt associated with third and fourth responses and additional tiers each associated with consecutively numbered response. In further alternative examples, the first prompt can include first, second, third et. seq. responses and the second prompt can include any number of responses, such as where the first prompt includes three responses, the second prompt can include a fourth response, et. seq. As shown in FIG. 2, Tier 1 includes the first prompt 204 associated with the Text Prompt 205 selection with data of "HI Aaron, are you interested in seeing our items on sale?" 204 and Response 1 of Tier 1 or a first response 207 associated with the Text Prompt 206 selection with the data of "Yes, I would" 207 and Response 2 or a second response 209 with the data of "No, I wouldn't" 209. Response 2 of Tier 1 or a second response 209 is associated with a Close Chat 208 selection with data of "No, I wouldn't" 209. Response 2 or the second response of the first-tier is an action that does not trigger an additional tier of conversation 201, but rather the close of the conversation 201. Tier 2 includes the second prompt 230 associated with the Text Prompt 224 selection with data of "Would you like to look at Top Sellers or Top Rated Items?" 230 and Response 1 for Tier 2 or a third response 232 with data of "Top Sellers" 232 and Response 2 for Tier 2 or a fourth response 234 with the data of "Top Rated" 234. Additional tiers, prompts and responses are shown in conversation 201, such as Tier 3 as the third prompt 241, and Tier 3 Response 1 as the fifth response 226 and Tier 3 Response 2 as the sixth response 227 etc. When the third response "Top Sellers" 232 is selected, there are only to options of a "Share" Button 207 or an "App Page" 213, while a share button in the form of a "Link" 206 is provided when the fourth response 234 or the "Top Rated" branch 214 is selected. In this case, a corresponding URL is entered in the link entry box 250 in the "Share To:" branch 248.

Further in this example, each ROKO SDK 110 response can contain up to 140 characters and the character count can apply to each input box with which the application developer 116 interacts. In other examples, the form and size of the data entered for creation of preconfigured conversations 201 can vary in type and size, such as an unlimited number of characters, or other forms of content including textual and visual content.

When the conversation 201 has been created, the conversation 201 can be made available to the application developer 116 to launch (based on a push or other functionality) to an application 112, or the application developer can choose to save the conversation as a draft by selecting the "Save as Draft" button 282. In this example, the application developer 116 has selected the "Continue" button 283. When the developer selects the "Continue" button 283, the conversation 201 is automatically saved as a draft. Also, a new page can open that allows the application developer 116 to configure which users will receive the ROKO SDK conversation 201, such as by selecting user properties (as shown in FIG. 1 as user properties 108 and in FIG. 2 as options 240, 246, 248 and 249) and/or segments (as shown in FIG. 1 as segments 109) associated with the event(s) 102, prompts 102 and/or responses 104 (as shown in FIG. 1) which trigger the launch of the conversation 201 in the mobile application 112.

FIG. 2 also shows the inclusion, in the ROKO SDK/API UI 203, of a ROKO Mobi Portal 285 navigation pane to provide the application developer 116 with a menu of functions associated with the ROKO SDK 110, including an option to open functionality regarding Analytics 290. Selection of this option by the application developer 116 supports access to the ROKO SDK 110 analytics processing and data, as described further below regarding FIGS. 12A and 12B and FIGS. 14A and 14B.

If an application developer 116 wants to edit the configuration of an active ROKO SDK conversation 201, one way to do so is from the ROKO SDK/API UI 203 of FIG. 2, by the mobile application developer 116 choosing an option from the "Select Existing conversation" 223 button of an existing or previously created conversation. Selecting an existing conversation from the 223 button opens the conversation page or view associated with the configured conversation 201. In the conversation view, the "Conversation Name" field can be inactive so no changes can be made to the name. Any changes made to the conversation 201 then can be incorporated into launches to applications 112 that have not previously received the conversation. As such, users of applications 112 that have either already completed or abandoned a conversation 201 do not receive the updated conversation 201 a second time. Once any changes have been made and the application developer 116 selects the "Save As Draft" 282 or "Complete" 283 buttons, the application developer 116 can be redirected back to a statistics page (not shown) on the ROKO SKD/API 101. The statistics page can reflect any changes to the questions, input buttons or other data entry that were made in the editing process. There can also be a "Last Edited:" date on the header row for reference.

The conversation 201 can consist of several levels and response variations. Instead of the SDK 110 sending the conversation 201 to an application 112 as a series of messages that can be individually affected by transmission errors, the entire conversation 201 can also be sent as one packet. In one example of a packet-transmitted conversation 201, only the first question can initially be made available to the user on the display 216. As such, with each user input, additional responses and actions associated with conversation 201 can be triggered based on the conversation configuration created by the mobile application developer 116 on the ROKO SDK/API UI 203 and as executed by the ROKO SDK 110. In another example, the application developer 116 can use her own custom UI (e.g., a variant of 203) in her developer application and still be able to configure and deploy conversations 201 from the ROKO SDK 110.

Each ROKO SDK conversation 201 can include a unique overall ID, such as the ID 290 shown on the ROKO SDK/API UI 203, and additional IDs for each conversation element, including each prompt 102, response 104, user property 106, segment 108 and each user input. The unique IDs are useful for tracking user conversation paths and generating valuable data relating to users' experience with the ROKO SDK conversations 201. More particularly, each ROKO SDK conversation 201 response can have any one or any combination of the following properties: response ID, tier value, button ID (the ID of the button that triggers this ROKO SDK response), response value (text of the ROKO SDK response, which can be a URL or key-value pair if the event type is selected), button A ID (the ID of a possible first response selected or activated by a user), button B ID (the ID of a second possible second response selected or activated by the user). (Can be Null). In one example, the following properties or responses (selectable user responses) can be assigned to each user input: Button ID; Button Name; Action Event Type; Response; URL; in-app page; Share button; Completed Flag; and Yes/No.

Different conversations 201 can share at least some identical or similar general features, but the ROKO SDK 110 also allows customizations for creating different conversation 201 configurations. For example, the application UI shown on the application 112 or 113 can consist of up to three (or more, in some cases) action buttons: e.g., as shown in FIG. 2, a Close Chat Button, a user input Button 1, and a user input Button 2. In another example, the display 216 can consist of a full screen application overlay and conversation bubble assets sized to fit the conversation 201.

In one example, the ROKO SDK 110 can build timing mechanisms into the conversation 201 to provide users of the applications 112 with an approximation of a real-time experience of the conversation 201. For example, after the user of the application 112 selects a response, a one, two, three, five (or a timing selected by the application developer 116) a one-second delay can be implemented before the ROKO SDK 110 continues processing the conversation 201. The conversation 201 then can display a conversation bubble that shows, for example, ellipses to alert the user that the conversation 201 is replying. The conversation bubble can be displayed for an additional one or more, seconds, or customized timing. At this time, the input button section can be blank and the next conversation 201 question in the conversation tree can then be shown to the user, along with the user input responses.

Figure 3:
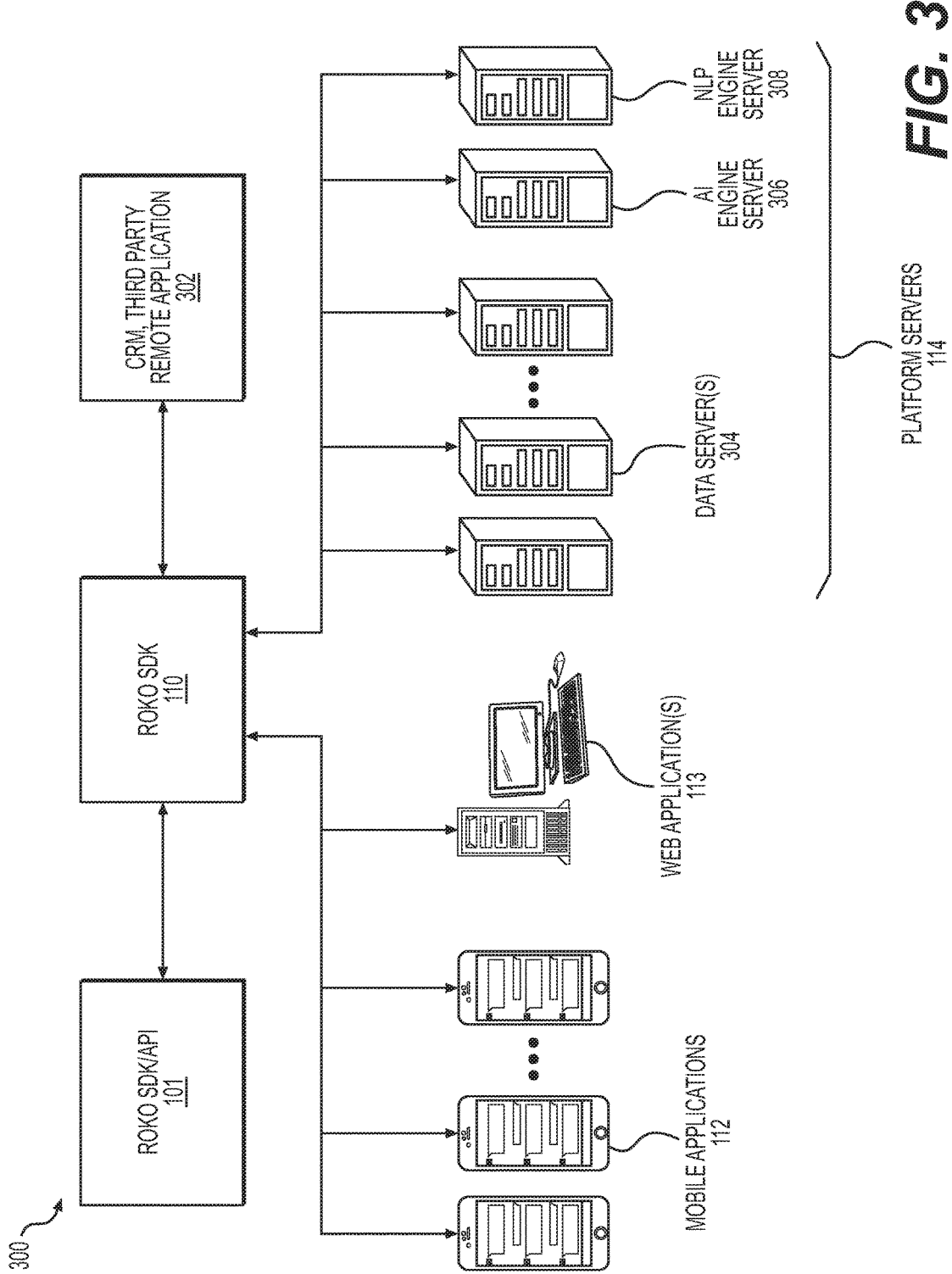
FIG. 3 is a block diagram of a system for the illustrative computing environment, showing components that an application developer could use to configure the conversations for launch in an application.

FIG. 3 is a block diagram of a system 300 for the illustrative computing environment, showing components that communicate to enable the mobile application developer 116 and ROKO SDK 110 to configure conversations 201 for launch in one of mobile applications 112 or web platform applications 113, and the creation of analytics (as shown and described in FIGS. 12A-12B) for use by the ROKO SDK 110, as well as for transmission through the ROKO SDK 110 or directly to third-party remote applications, such as a customer relationship management or CRM applications 302, as well as other third-party applications with which the ROKO SDK 110 can communicate. The system comprises the ROKO SDK 110 that can communicate with the application ROKO SDK/API 101, as well as additional servers discussed below. The data servers 304 can store, and can also process, data for various uses such as for the one or more databases comprising Application Events 102, Prompts 104, Responses 106, User Properties 108 and Segments 109 (as shown in FIG. 1) or for generating or applying the analytics. The application developer 116 uses ROKO SDK/API 101 to create and deploy conversations 201 to mobile applications 112 or web platform applications 113 through the ROKO SDK 110. Application user responses from the applications 112 and 113 are sent back to the ROKO SDK 110 and stored in data servers 304.

The creation of the conversation 201 as well as the receipt, processing and analysis of data associated with the conversations 201 can be enhanced by the use of artificial intelligence or AI, as shown by an AI engine 306, and natural language processing or NLP, as shown by a NLP engine 308. In another example, an application 112 or 113 user may verbally respond within the conversation 201 pushed by the ROKO SDK 110, and the response can be processed by the AI engine 306 and NLP engine 308 and an appropriate prompt selected, depending on the conversation 201 created by the ROKO SDK 110. The ROKO SDK 110 also can provide analytics based on the application 112 or 113 user's responses to the conversation 201, the analytics generated from the conversation can be communicated directly from the ROKO SDK 110 to the third-party CRM system 300. Analytics can include, as examples, the count of conversation tiers that the user responded to, the time that the user spent in the application, and the count of conversation tiers in the conversation 201. The analytics are further described in FIGS. 12 and 14, referenced below.

FIG. 4 is a block diagram of a system 400 for the illustrative computing environment, showing data transmissions and particular components of the ROKO SDK 110 in the grouping labeled 401 and interactions with Push Notifications Server (APNS, FCM) 402, Client Application 414 and Portal Administrator 416 in order to create conversation(s) 201. The ROKO SDK 110 grouping 401 includes components ROKO Mobi API 420 and ROKO Mobi Portal 422 and the components with which these components interact, including hardware components, such as a Push Notifications Processing module 424, a InstaBot Conversation Storage 430 database 430 and an Application Events 102 database and processing between these components, including Send Push Messages 428, Writing Analytics Events 426 and Generating Reports 434. Initially in this example, the Push Notifications Server (APNS, FCM) 402 can send Push Alerts 403 to a Client Application portal 414 prompting the client to register a device 404. The client can subscribe for Push Alerts 406 from the ROKO Mobi API 420. Upon subscription, the Client Application Portal 414 can receive In-App Notifications 408 and get conversation details 410 from the ROKO Mobi API 420. The Client through the Client Application 414 can be a mobile application developer 116 using the Client Application 414 to create and manage the launch of conversations 201 in the mobile applications 112 or web platform applications 113 with which the mobile application developer 116 manages. The portal administrator 416 can use the ROKO Mobi Portal 422 to manage and configure ROKO SDK 110 conversations 201. One ROKO product name for an exemplary conversation 201 shown in FIG. 4 is a ROKO InstaBot™ and an additional product name is a ROKO PushBot™, as referenced in various figures in the instant application.

The conversations created 201 can be stored in the InstaBot Conversation Storage 430 database. The InstaBot Conversation Storage 430 database can transmit conversations 201 to the ROKO Mobi API 420 and to the Push Notifications Processing module 424. The Push Notifications Processing module 424 can then send Push messages 428 to the Push Notifications Server (APNS, FCM) 400 for deployment to the Client Application 414. All interactions between the Client Application 414 and ROKO Mobi API 420 include the launching of conversations 201 and the transfer of data comprising or associated with the conversation 201, such as events, prompts, responses, user properties and segments (as shown in FIG. 1 as data stored in databases 102, 104, 106, 108 and 109, respectively). Reports 434 can be generated and viewed by the Portal Administrator 416 via the ROKO Mobi Portal 422 interface.

FIG. 5 is a block diagram of a system 500 for the illustrative computing environment, including showing particular components of the ROKO SDK 110 in the grouping labeled 401 and interactions with client applications to generate analytics. Various client applications (developed for their different operating system platforms using their corresponding SDKs, for example, iOS 502, Android 504, Web 506, Cordova 508, Corona 510, REST API Client 512 and Custom 514, noting that these are non-limiting examples and additional client applications are within the scope of the invention) transmit their analytics events data 516 to the ROKO Mobi API 420. The analytics events 516 data is used by the ROKO Mobi API 420 to analyze, for example, application user behavior and trends based on various metrics, to store application events in the application events 102 database and to generate reports. The generated reports can then be sent at 434 to the ROKO Mobi Portal 422 and then forwarded to the Portal Administrator 116.

Figure 6A:
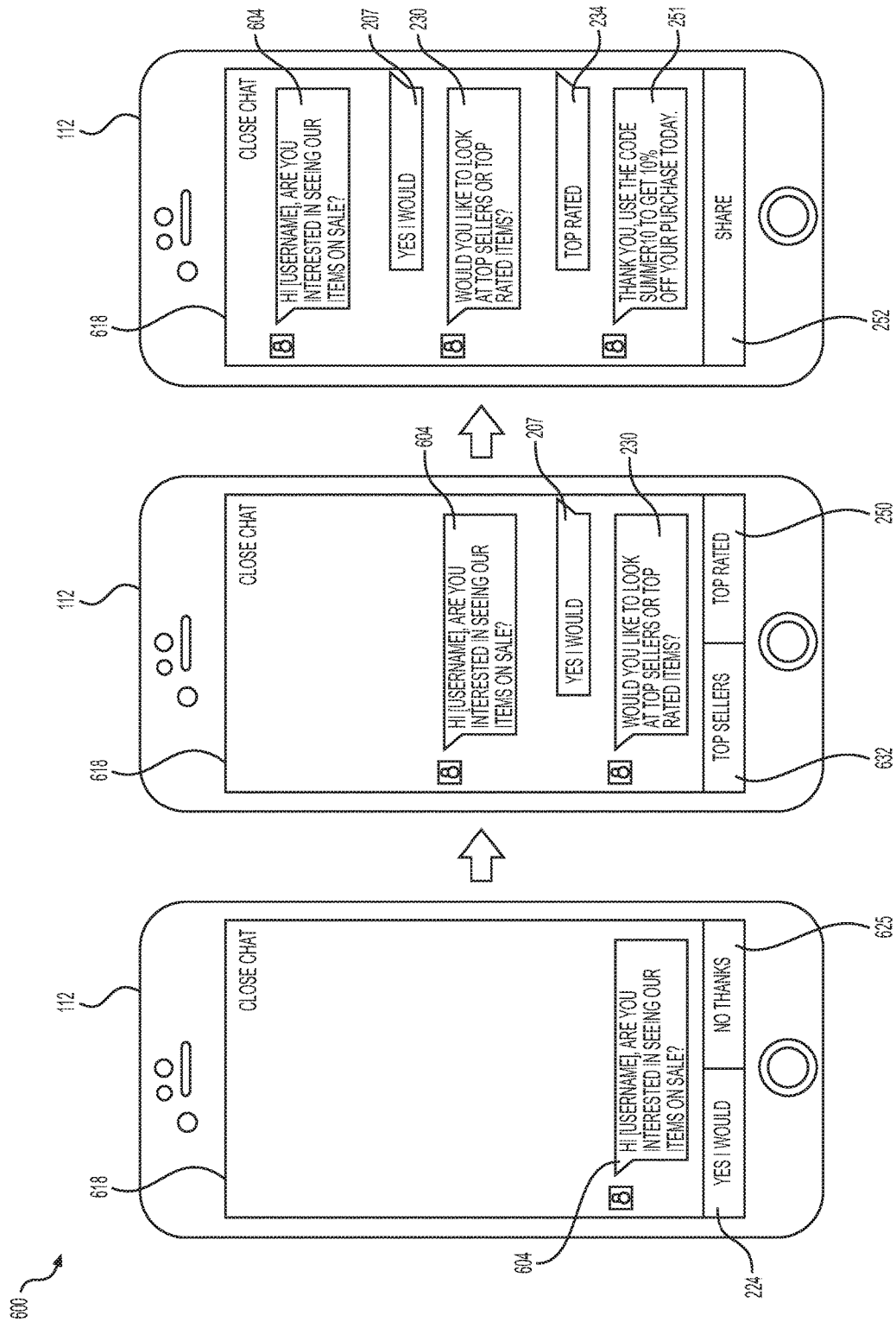
FIG. 6A is an illustrative computing environment including illustrative user interface displays on a mobile application for the presentation of an exemplary conversation.

FIG. 6A is an illustrative computing environment 600 including an illustrative user interface display 618 as part of the user interface 203 which presents to the mobile application developer 116 a partial preview of the user interface display 216 (as shown in FIG. 2). However, in this FIG. 6A example, the user interface display 618 includes the use of a conditional object "[USERNAME]" rather than direct input by the mobile application developer 116 for creation of the conversation 201. Conditional objects can provide an additional significant advancement for some examples of the creation of conversations 201 in automatically populating the data entry by a mobile application developer 116 in a manner that further customizes the conversation 201 for the user of the mobile application 112. With the overall objective for the conversations 201 of engaging with the user of the mobile application 112, incorporating data that unique to the user, and thereby personalizing the conversation, can further support achieving that objective.

Conditional objects are now further described. The system 100 for the creation of conversations can include conditional objects, also referred to as merge tags, that can on an automated basis pull in information such as text, image, audio or video data or fields from databases, processing and organized data fields (such as, for example, forms) from resources which the mobile application developer 116 can access, such as mas112 and web applications 113. Additional examples of resources where conditional objects can be accessed are shown in FIG. 4 as a variety of components, such as the ROKO Mobi API 420, ROKO Mobi Portal 422, the InstaBot Conversation Storage 430 database 430 and the Application Events 102 database, as well as additional mobile applications created by the mobile application developer 116, 112 and other ROKI, mad 116 resources of third party resources such as CRM applications 302. The username example is shown in FIG. 6A (shown as [USERNAME] within the data for a Tier 1 first prompt 604 of "Hi [USERNAME], are you interesting in seeing your items on sale?" 604) as a conditional object for the identity of the user of the mobile application 112. The data to populate [USERNAME] in this example can derive from the user profile (which is shown in FIG. 2 for example, as "AARON").

Additional data which can be used as a source of conditional objects are user properties collected from user responses to conversations 201 (as shown in FIGS. 2 and 9A-9G), the FIG. 4 components listed above, as well as external platforms and web hooks. Examples of particular conditional objects are: user name, first name, company name, an image which the user has identified (such as for example, as a "favorite"), or any other collected data in structured data tables within an applications' back-end system, CRM system, or external database, including based on accessing any of the databases, processing or storage of systems available to the mobile application developer 116 through ROKO or with third party systems.

The conditional objects or merge tags can be pulled into the conversation 201 through a variety of data entry for customizing data input into the user interface 203. For example, a system of text codes, such as [USERUNAME], [UNAME], {USERNAME} (as shown in FIG. 6A) or {UNAME}, can be used. Additional text codes are as follows: {DNAME} for display name, {DATE} for current date as DD/MM, {CUSTPROP NAME} as an insert for a custom property value which can be entered by the user (such as, for example, {CUSTPROP FAVORITECOLOR} for the color "green") and {EMAIL} for the user's email address, {DEMOGRAPHIC} for data related to the demographic for the user, and {LOCATION} for data related to the geographic location of the user etc. These text codes will then pull information unique to the individual mobile application 112 or web application 113 user, or unique to user segments from data tables into text prompts or responses, such as, for example, as shown in the data entry 604 for text prompt (not shown with the conditional object but associated with the text prompt 204 in FIG. 2). In addition, multiple conditional objects can be included in a single data entry fields. For example, another data entry similar to entry 204 but with multiple conditional objects is "HI {UNAME}, we see that you liked {CUSTPROP DetergentBrand}, have you considered also using the fabric softener?"

FIG. 6A including the use of the conditional object within data entry 604 is now further described. As the conversation 201 is being formed by the mobile application developer 116 on user interface 203, it is displayed in part on the preview screen 618 of application 112. While the FIG. 2 preview screen display 218 shows a duplicate of the conversation 201 on the user's mobile application 112, in FIG. 6A, the conditional object "[USERNAME]" is presented for replacement on the mobile application 112 user's display 216 of the username personalized for the particular user. There are a series of three displays 618 which show the progression of the discussion as the mobile application developer 116 adds components to the conversation 201 and mimics user input by the user of the mobile application 112. At the first display 618 on the left hand side of FIG. 6A, the sample conversation 201 is initiated by the ROKO SDK 110, with data for a Tier 1 first prompt 204 of "Hi [USERNAME], are you interesting in seeing your items on sale?" 204 and a corresponding set of buttons for a binary response selection by the user of the application 112, including "Yes I would" 224 and "No Thanks" 625 responses (corresponding to FIG. 2 data entry 207 and 209, respectively). The progression of the conversation 201 is shown further the next or second display 218. When the user selects the "Yes I would" 224 button, the following are displayed: a Tier 2 second prompt of "Would you like to look at top sellers or top rated items?" 230 (as also shown in FIG. 2) and another set of buttons for a binary response selection by the user of the application 112, "Top Sellers" 632 and "Top Rated" 250 responses (corresponding to FIG. 2 data entry 232 and 234, respectively). The progression of the conversation 201 is shown further the next or third display 218. When the user selects the "Top Rated" button 250, a Tier 3 third prompt 240 is displayed with an offer code for a product discount, i.e., "Thank you, use the code SUMMER10 to get 10% off your purchase today" 251. The third-tier portion of the conversation 201 also provides a response button "Share" 252 to allow the user the share the promotional offer with other users. The Share button 252 can trigger the configured Share function, or the ability of the user of the mobile device to share data with third parties. Selecting this option sends the ROKO SDK "Conversation Completed" status to ROKO analytics 290, as described further with respect to FIG. 14A.

Figure 6B:
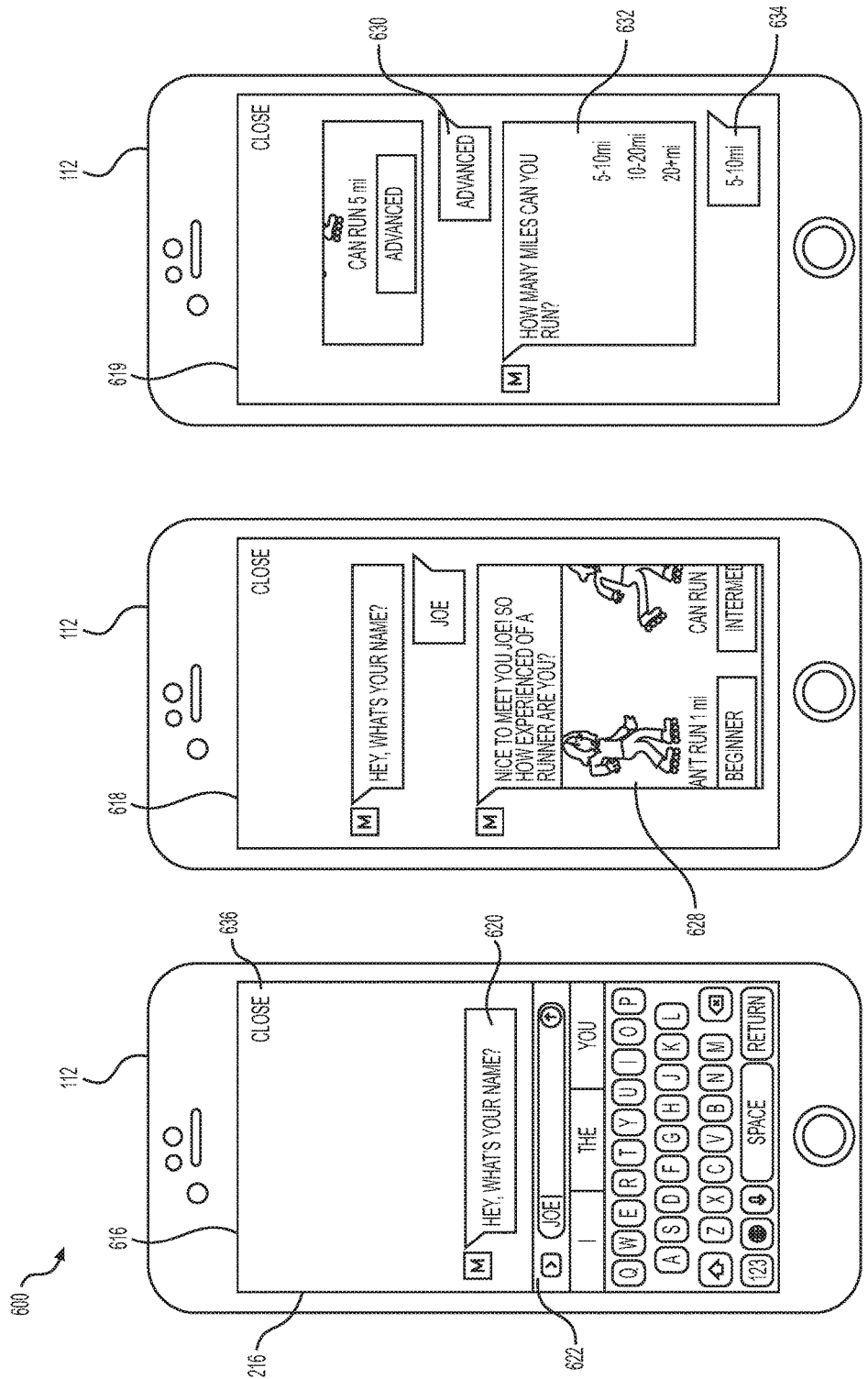
FIG. 6B is another illustrative computing environment including illustrative user interface displays on a mobile application 112 for the presentation of an exemplary conversation 201.

FIG. 6B is another illustrative computing environment 600 including illustrative user interface displays 618, 618, and 619 on a mobile application 112 for the presentation of an exemplary conversation 201. At display 618, the sample conversation 201 is initiated by the ROKO SDK 110, with data for a Tier 1 first prompt of "Hey, what is your name? 620, and a corresponding data entry box for the user of the mobile application 112 to enter a text response. The first prompt 620 is associated with a single response (also referred to as a first response) based on the user data entered into the data entry box. In this example, the user enters the data "Joe" 622. At display 618, the data entered is now presented on the display, i.e., Joe 624. Then, a Tier 2 second prompt of "Nice to meet you Joe! So how experienced of a runner are you?" 626 is provided. The data entry option for this second prompt in the form of a text prompt selection (as generally shown in FIG. 2, using different exemplary data), is a carousel data selection entry, with visual blocks which can include text and depictions and controls for the user to horizontally scroll through multiple selection options, i.e., in this case, a portion of a beginner visual and a portion of an intermediate visual is shown, and additional options such as intermediate and advanced also are partially shown or obscured as available to the user of the mobile application 112 to select at data selection box 628. The second prompt therefore included multiple responses, and in this example, at least the three responses (which also can be referred to as a second response, a third response and a fourth response based on the Tier 1 first prompt including solely a first response) of Beginner, Intermediate and Advanced. Then, at display 619, the user's selection of the option for "Advanced" in the user selection box 628 is now presented as box 630. Further, at display 619, a Tier 3 third prompt is displayed as follows: "How many miles can you run?" and multiple responses shown as multiple choice data selections, "5-10 mi," "10-20 mi" and "20+ mi" 632. The data entry option for this third prompt in the form of a text prompt selection (as generally shown in FIG. 2, using different exemplary data), is touch screen multiple-choice selection, demonstrating a further example of alternative data entry design. The variety of data entry designs that can be applied to individual prompts and responses include standard and customized approaches to data gathering and therefore, a variety of individual data entry designs for individual prompts and responses are within the scope of this invention.

FIG. 6B provides another example of the variety of options available for data or action responses, which at one level can be described as one of multiple data types, including a data entry, a data selection, an action, or an abandonment of the conversation. In other examples, the description of the variety of forms of response can further include textual, visual, audio, video, and further descriptions such as an action option, a selection option, a visual option, an audio option, a data entry based on freeform text, a data entry based on a binary selection, a data entry based on a multiple choice selection, a data selection, a voice input, a visual input or a close action, the close action comprising an action to end the conversation based on one of an action to move to a page of the application in which the conversation is running, an action to move to another page in another application, an action to activate a deep link, an action to go to a URL of another application, or an action to share data about one of the application or the another application.

FIG. 7 is an illustrative computing environment 700 including an illustrative ROKO SDK/API UI 203 for the application developer 116 to manage conversations 201. FIG. 7 shows the ROKO SDK/API UI 203 page titled "InstaBot Conversations." As noted above, an example of a product name for a conversation 201 is an InstaBot as referenced in various figures including FIG. 4 and FIG. 7 in the instant application. In this example of the UI 203, the application developer 116 uses panes within the UI 203 to create conversations 201. Further, the previous example, of the UI 203 illustrates one approach to data entry, display, and selection for the conversation 201, with other data entry, data display and selections being available within the scope of the invention.

The UI 203 includes a conversations pane 706 listing the available conversations 201 in a grid that includes column headers: "Conversation Name" 712, "Initial Question" 714, "Engagement Rate" 716, "Deploy Date" 718, and "Status" 720. A "New Conversation" button 708 is shown on the upper right-hand corner. When selected, this button 708 allows an application developer 116 to create a new conversation 201. The "Search" button 710 allows existing conversations 201 to be filtered or sorted. The existing conversations 201 can be searched or filtered according to conversation name, or according to a corresponding initial question, engagement rate, deployment date, or status.

To create a new conversation 201, a developer can select the "New Conversation" button 708 on the top right corner of the application developer user interface. Conversations 201 can have multiple levels of responses (see for example FIG. 2, which shows a Tier 1 first prompt 204 with two possible responses, one of which, 206, leads to a first response 208 which branches out to another set of responses 231 and 233). In one example, the maximum number of tiers of conversations is three and in FIGS. 2, 6A and 6B, for individual prompts, one, two and three responses are shown, but in other examples, there can be a range of prompts or tiers of the conversation 201, as well as a range of responses, with or without a maximum number building into the creation of the conversation 201, including for both prompts and responses, the number being unlimited in another example of a conversation 201. The design of conversations 201 with maximums, a predetermined range, or an unlimited option to continue to build prompts, responses and closing actions to conversations 201 impacts how the mobile application developer 116 manages the experience of the user of the mobile application 112. Where a maximum number is implemented, it can reduce implementation complexity and balance an interest in launching robust user interactions with the desire to avoid overburdening the user or maintaining a conversation 201 so long that the user disengages before completion of the conversation 201. As another example of managing the user experience with conversations 201, a conversation 201 can be executed once for a given user of an application. In other examples, the conversation 201 can be executed multiple times per user, or the conversation 201 can be configured to have variations as a function of the number of executions per user by employing in one example the number of executions of the conversation 201 as a user property and/or associated with a user segment, such as, for example, a segment of users who have received a quantitative or qualitative measurement of the particular conversation 201 or conversations in general based on the number of conversations executed, whether the user provides feedback about a particular conversation 201 or a survey about the use of conversations 201 in general.

The ROKO SDK 110 user interface 203 also provides data fields for the application developer 116 to assign identifiers for the conversation 201, including the conversation name, for example. In the example shown in FIG. 7, identifiers can be listed in a grid to allow for quick browsing and sorting. The grid can include various columns including high-level information about each conversation 201. The column headers can include, for example, "Conversation Name" 712, "Initial Question" 714, "Engagement Rate" 716, "Deploy Date" 718, and "Status" 720. An Initial Question can be a first question in a conversation 201, which the user can respond to by providing input into the conversation 201 as launched in the application 112 or 113. The Engagement Rate 716 can relate to the number of users who answer at least one question of the corresponding conversation 201 launched in the application. The Deploy Date 718 can be the date a conversation 201 became active and launched to the application 112 or 113 for interaction by users. The Conversation "Status" 720 can be designated as active, inactive, pending, or draft. The listing of conversations 201 can be searched for specific conversations 201 according to name or filter status 720.

Figure 8:
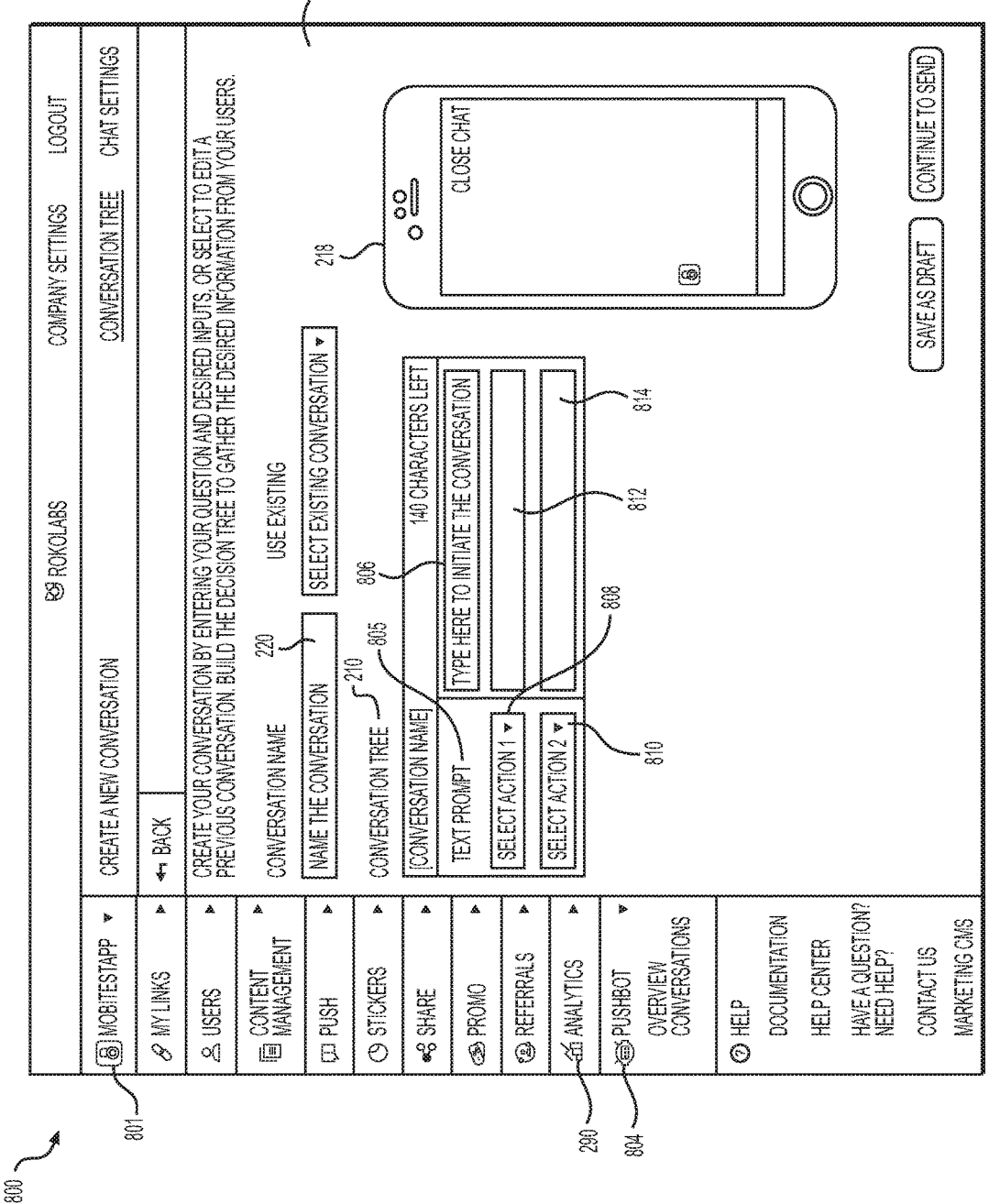
FIG. 8 is an illustrative computing environment including an illustrative user interface for an application developer to create conversations.

FIG. 8 is an illustrative computing environment 800 including an illustrative ROKO SDK/API UI 203 for an application developer 116 to create conversations 201. Specifically, FIG. 8 shows the navigation pane of the ROKO SDK/API UI 203. Before entering or selecting inputs for the conversation 201, the UI 203 presents the application developer 116 with a data entry field to name a conversation, referred to as the conversation name 220 box. The conversation name 220 can allow tracking of the conversation 201 statistics. Each named conversation 201 can be stored in one or more servers 114.

As shown in the example represented in FIG. 8, the option "MobiTestApp" 801 on the menu pane within the user interface 110 has been selected by the developer. The MobiTestApp 801 portal can allow the application developer 116 to create a new conversation tree. In this example, the corresponding portal screen or page 802 provides boxes for entering a conversation name 220 or selecting a name of an existing conversation 201. If no conversation name 220 is entered and the application developer 116 tries to continue to send, a validation error message can be triggered that highlights the empty box and produces an error message such as "Conversation Name Required. Please name this conversation before continuing."

The MobiTestApp 800 portal the ROKO SDK/API UI 203 also can show data entry fields 210 for inputting text entries for a prompt and two responses (as shown and described in FIG. 2 above) and a conversation tree 210 (as also shown in FIG. 2). In one example, the configuration of the conversation tree 210 can be quasi-customizable or completely customizable by the application developer 116 at the user interface of the ROKO SDK 110. The ROKO SDK 110 also can support editing the conversation 201 to include multiple prompts, such as in one example, three tiers or levels of prompts, and in other examples, five, ten or an unlimited number of levels of questions or interactions. FIG. 8 UI 203 also includes a first prompt of a conversation, which can be populated by, for example, the data shown in FIG. 2, prompt 205 and corresponding data entry 204, first response 206 and data entry 207 and second response 208 and data entry 209.

The application 112 display 218 on the right-hand side of the ROKO SDK/API UI 203 allows an application developer 116 to preview a conversation 201 as the conversation tree is created. The navigation pane also includes the menu options Analytics 290 and one example of a product name for the conversation 201 "PushBot" 804, each of which can contain one or more additional options. As an example of navigation that can be employed in the ROKO SDK/API UI 203, these additional options can be viewed by clicking the corresponding arrowhead symbol, which changes direction from right facing to downward facing when selected. The specific implementation of data entry fields, selections, and other forms or input can be customized to support artificial intelligence or natural language processing (as shown in FIG. 3, as AI and NLP engines 306 and 308, respectively).

A range of implementing data entry and display to support creating conversations is within the scope of the invention.

In one example, the conversation 201 can be initiated by entering characters of the message (such as, for example 140 characters) into the data entry box 806 associated with a Text Prompt 805 to display as the conversation 201 can be initiated on the user interface 216 of the application 112 upon trigger of the conversation 201. Once the message has been entered into the box 806, an updated preview on display 218 as a preview of the mobile application 112 can displayed that includes the entered message (shown in FIG. 2 as 204). The mobile application developer 116 can then 112 select from drop-down boxes 808 and 810 to determine responses, with two being provided in this example. For a first action drop-down button, representing a response, there are two general types of data selections, data entry including a text prompt or a data selection or entry option or actions including redirecting the conversation 201 to a different location, page, link or other identifier within the current application 112, outside the application 112, to another offering by ROKO through the ROKO SDK 110 or another ROKO offering or to any other mobile application developer 116 designated location, including third-party applications. An additional action that can be selected as one of the responses is a close action, which terminates the conversation 201. However, in alternative examples, a Close or Close Chat button can be present and available during the conversation 201 as another option for the user of the mobile application 112 to terminate the conversation 201. When a selection is made from the drop-down buttons 808 and 810, for a text prompt selection, an additional prompt and one or more responses can be added in a subsequent additional tier of the conversation 201 (not shown), data entry boxes 812 and 814 also can be used depending upon the selection in the drop-down boxes 808 and 810 for data entry, or actions which require data associated with the actions to be entered, as further described in FIG. 9.

Figure 9A:
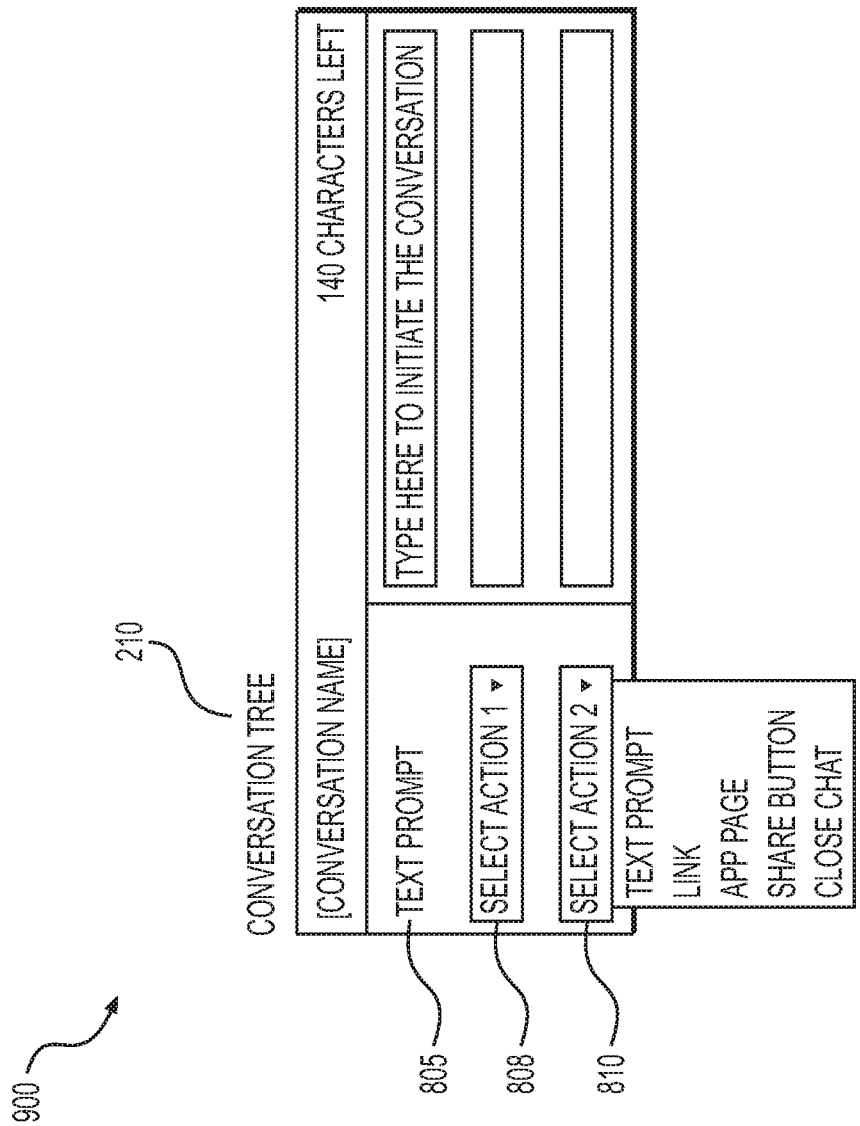
FIG. 9A is an illustrative computing environment including an illustrative portion of a user interface for an application developer to create a first-tier within a conversation.

FIG. 9A is an illustrative computing environment 900 including an illustrative portion of the ROKO SDK/API UI 203 for an application developer 116 to create a first-tier within a conversation 201. FIG. 9A shows a multi-level conversation tree launched by the "New Conversation" button 708. As also described in FIG. 8, the conversation 201 can be initiated by the ROKO SDK/API UI 203 receiving, for example, characters in a data entry box associated with a Text Prompt 805. For every conversation level, in this example, one action button 808 labeled "Select Action 1" represents a first response and another action button 810 labeled "Select Action 2" can be suggested (or, in some examples, required) with the capability to add additional action button(s). The application developer 116 can select using the drop-down arrow a button name to activate the action button 902. In this example, for "Select Action 2," the drop-down box includes the options for selection by the mobile application developer 116, including "Text Prompt," "Link," "AppPage," "Share Button," and "Close Chat" as examples of actions which can be taken as a response to a prompt. When a data entry field associated with an action button selection is populated, it can be mirrored on a displayed preview 218 (as shown in FIGS. 2 and 8). The application developer 116A can be provided with additional opportunities to enter additional data selection buttons on the ROKO SDK/API UI 203 with additional data entry fields, based on a predetermined maximum or an opportunity to continuing adding additional tiers indefinitely. When the conversation tree 210 has been completed, one or more messages can be displayed to indicate the completion of the conversation (not shown). In one example of UI 203 (shown in FIG. 2), each branch of the conversation tree 210 branch can be minimized by activating appropriate navigational controls, or a time out function, or other methods for navigation using user interfaces, which are included in the scope of the invention. The manipulation of the UI 203 can serve to make creating and editing the conversations 201 easier, particularly as they become longer with multiple tiers.

Figure 9B:
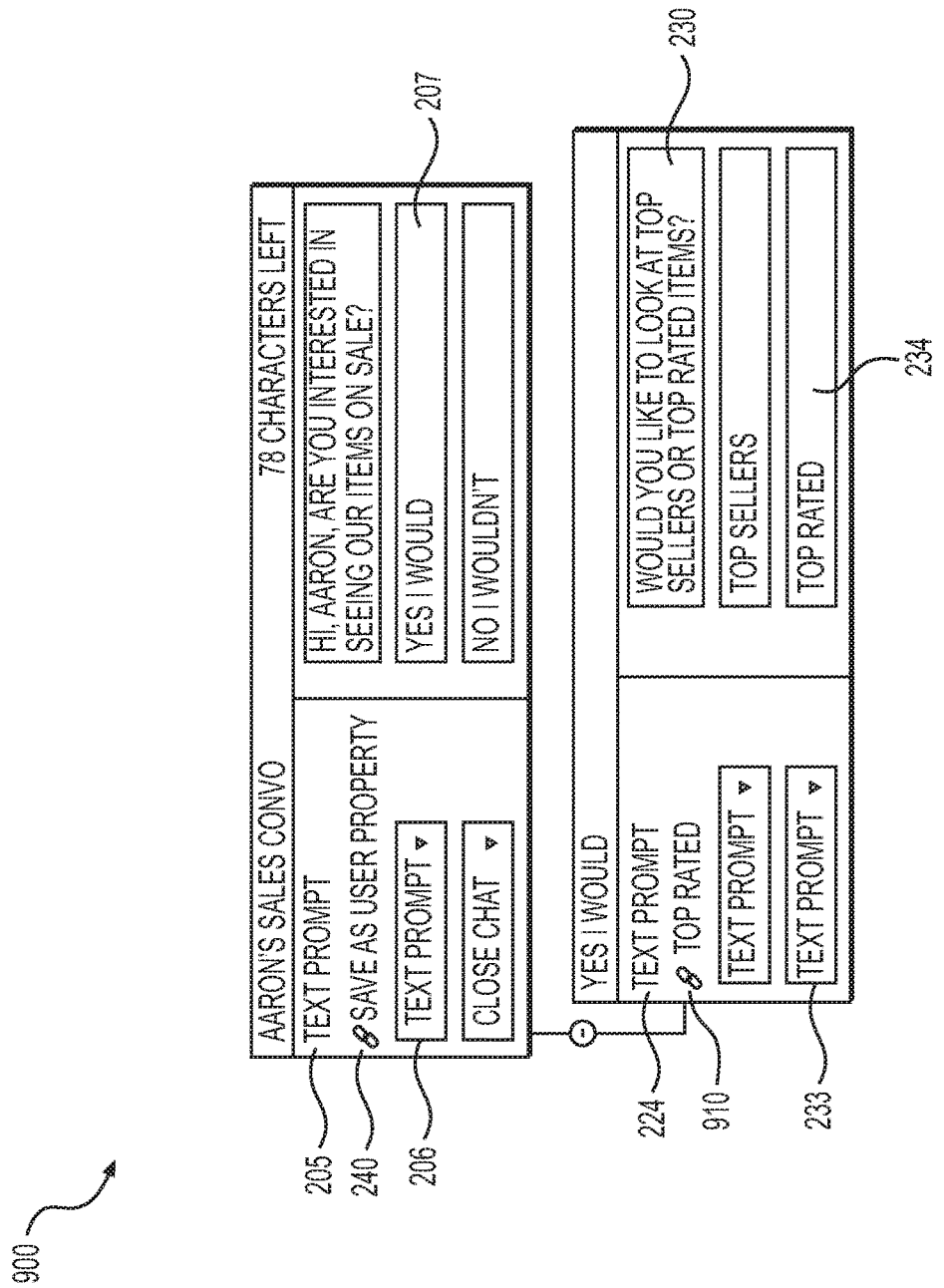
FIG. 9B is an illustrative computing environment including an illustrative portion of the FIG. 2 user interface for an application developer to create a second-tier within a conversation based on a specific data selection within the first-tier conversation.

FIG. 9B is an illustrative computing environment 900 including an illustrative portion of the ROKO SDK/API UI 203 for an application developer 116 to create a tier two portion of the conversation 201 shown in FIG. 2. Selected prompts and responses from FIG. 2 are highlighted as follows: first prompt 204, first response 240, data entry associated with the first response 207, second prompt 230 associated with the first response 206, forth response 233 associated with the second prompt 230 and the data associated with the fourth response 234. The conversation 201 illustrated in FIG. 9B also includes, for the Tier 1 portion of the conversation 201, an option 240 to save the selected response, for example, the data entry associated with the first response 207, as a user property and for the Tier 2 portion of the conversation 201, an option 910 to save the one of the responses, i.e., the data associated with the fourth response 234 as a user property if it is elected by the user of the mobile application 112 (while a mobile application 112 is shown in FIG. 2, a web platform application 113, as well as other applications and technology environments are within the scope of the invention).

Further for this example of the conversation 201, the UI 203 triggers the appearance of the second prompt 230 when the MAD 116 selects the first response 206 to further build out in the conversation 201. Thus, for the selected first response "Yes, I would," the mobile application developer 116 then enters "Would you like to look at top sellers or top rated items" as the data entered into the data entry field 230 associated with second prompt. There also is a connector 270 from the box presenting the second prompt 230 to the box presenting the first prompt 204, which represents the association between the second prompt 230 and the first response 206.

Figure 9C:
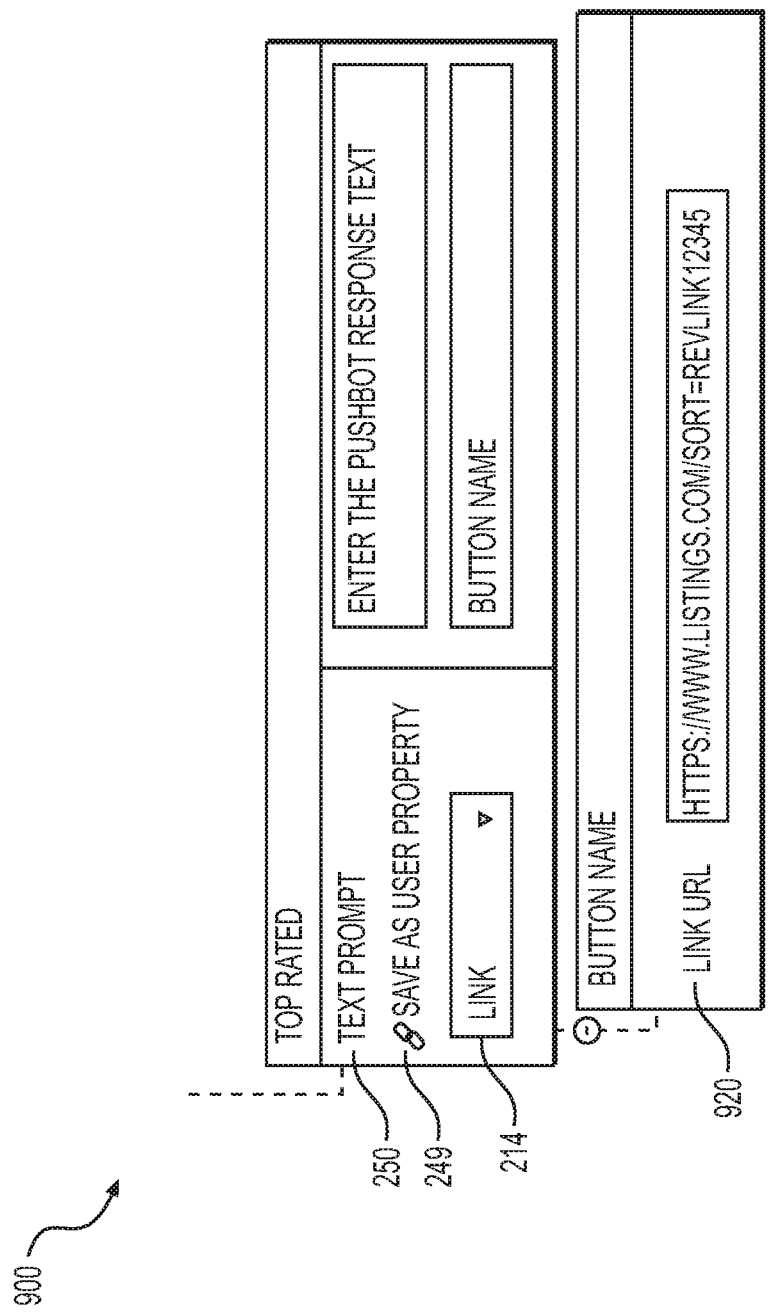
FIG. 9C is an illustrative computing environment including an illustrative portion of the FIG. 2 user interface for an application developer to create a third-tier within a conversation based on a specific data selection within the second-tier conversation.

FIG. 9C is an illustrative computing environment 900 including an illustrative portion of the ROKO SDK/API UI 203 for an application developer 116 to create a Tier 3 portion of the conversation 201 shown in FIG. 2 based on a specific data selection within the Tier 2 portion of the conversation 201. The Tier 3 third prompt 250 is launched when the fourth response 233 with the data entry of "Top Rated" 234 shown in FIG. 9B is selected. In this example, the response provided is a link that requires entry of the link URL. As shown, the selected action button is the "Link" button which upon selection opens a second window labeled "Button Name" 920 (as an alternative to the data entry approach shown in FIG. 2). The window 920 also allows the mobile application developer 116 to enter a link in the form of an external URL that opens the identified link on the mobile application 112 user's device. When the application 112 user selects or clicks on this button, the ROKO SDK conversation 201 receives the application 112 user input and designates and transmits a "Completed" status for this action (entry and opening of the external URL) to ROKO Analytics 290.

Figure 9D:
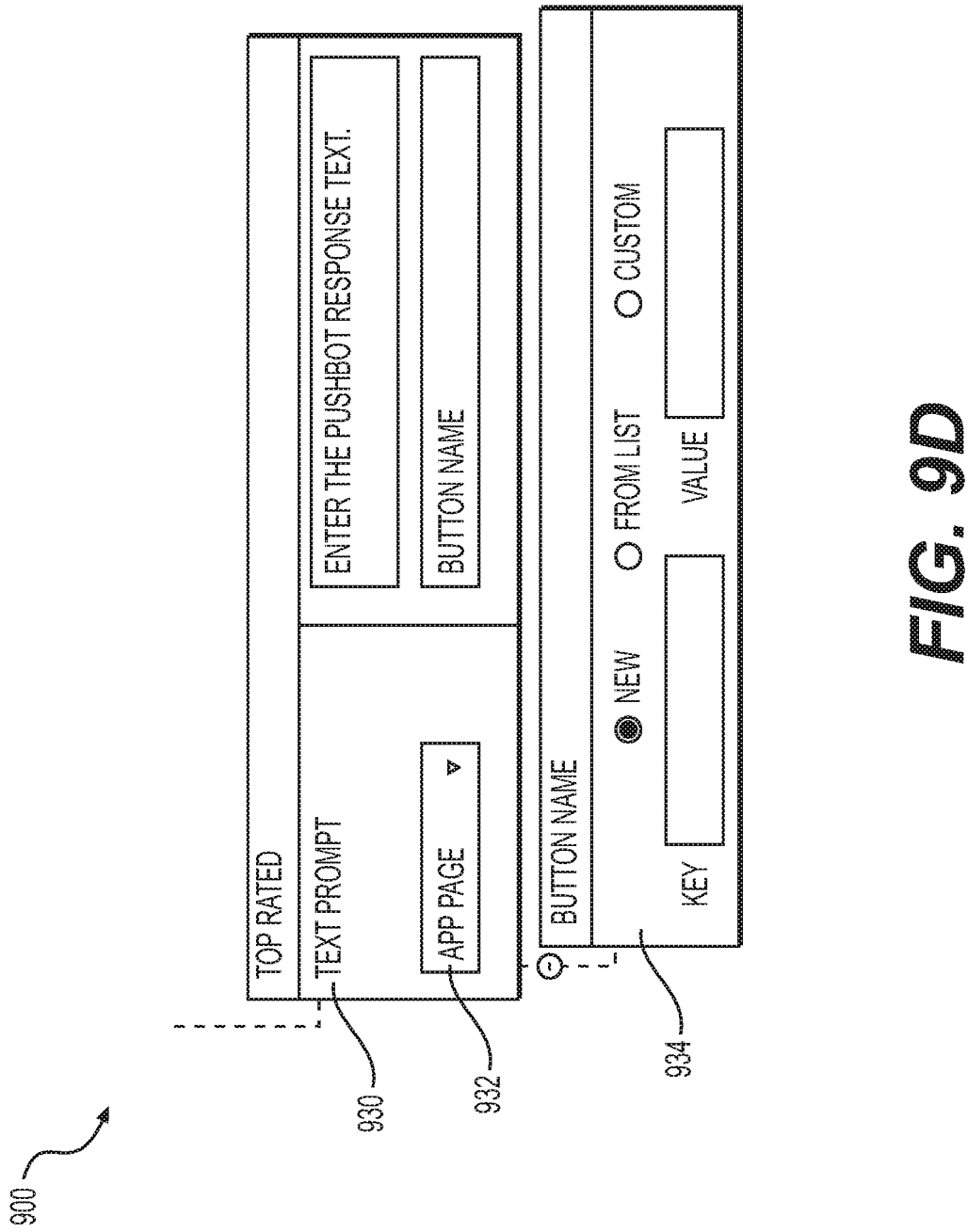
FIG. 9D is an illustrative computing environment including an illustrative portion of the FIG. 2 user interface for an application developer to create a third-tier within a conversation based on another specific data selection within the second-tier conversation.

FIG. 9D is an illustrative computing environment 900 including an illustrative portion of a ROKO SDK/API UI 203 for an application developer 116 to create a Tier 3 portion of a conversation 201 shown in FIG. 2 based on another specific data selection within the conversation 201. Further, the previous example shows the Tier 3 third prompt 930 with a fifth response 932 of the "App Page" 932 selection. The "App Page" 932 selection triggers the display of a further data entry box 934 which allows the application developer 116 to select an existing saved key-value pair or to enter a new key-value pair that enables an application 112 user to be directed to a certain page within the mobile application. As shown, the "New" option located above a key box and a value box have been selected, which means the mobile application developer 116 is entering a new key-value pair. When the application 112 user selects this option, the ROKO SDK 110 designates a "Completed" status for this selected action and then transmits that action status to ROKO Analytics 290. In one example, an application 112 user's selection of a "Yes" button causes a user to be directed out of the ROKO SDK conversation 201 and onto a page within the application configured according to the key-value pair set by the application developer 116 in the box 934.

Figure 9E:
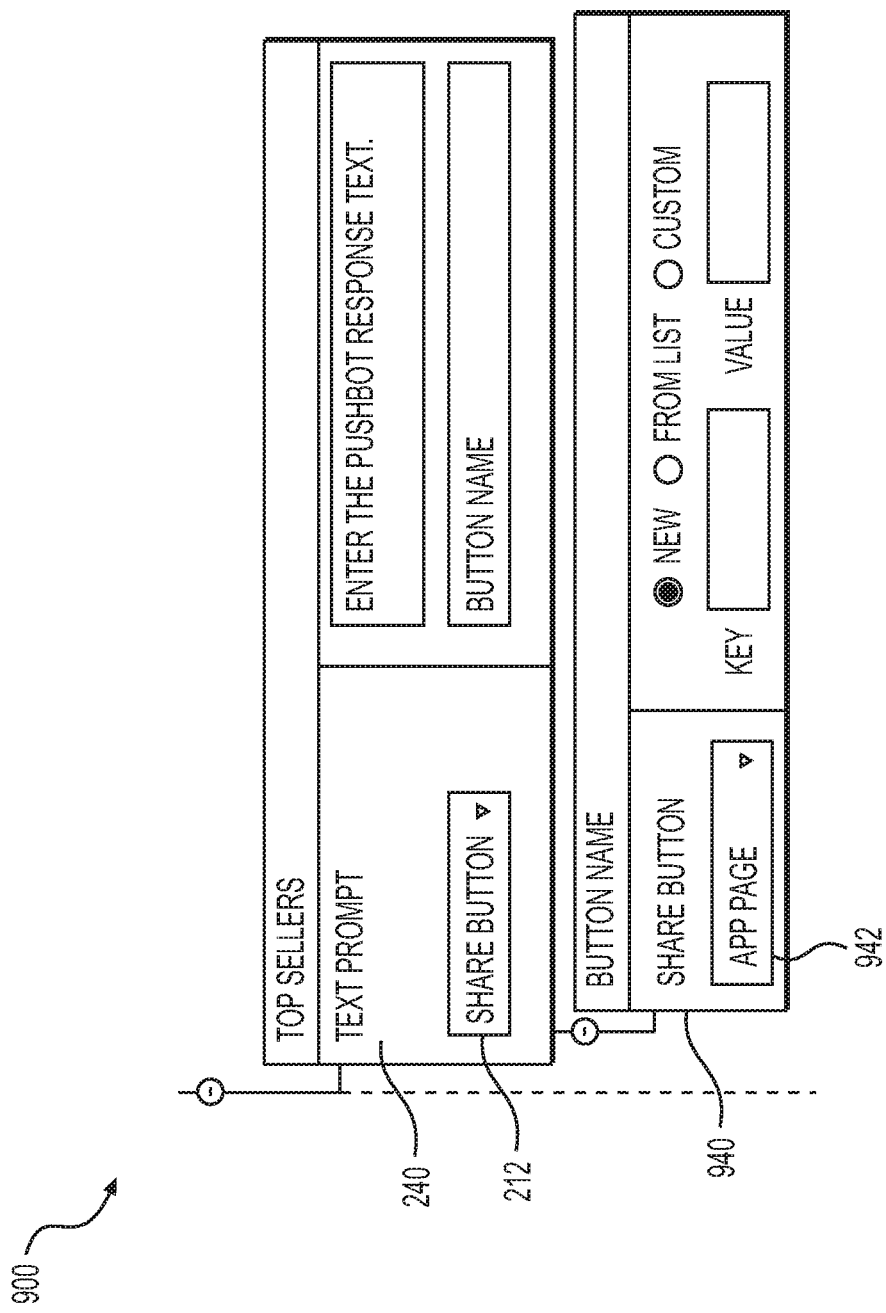
FIG. 9E is an illustrative computing environment including an illustrative portion of the FIG. 2 user interface for an application developer to create a third-tier within a conversation based on another specific data selection within the second-tier conversation.

FIG. 9E is an illustrative computing environment 900 including an illustrative portion of a ROKO SDK/API UI 203 for an application developer 116 to create a third-tier within a conversation 201 shown in part in FIG. 2 based on another specific data selection within the conversation 201. The previous example shows a Tier 3 third prompt 240 with an alternative fifth response 212 of the "Share Button" 212 selection. The "Share Button" 212 selection triggers the display of a further data entry box 940 (not shown in FIG. 2) that allows the application developer 116 to select another response or a sixth response 942 associated with the "Share Button" 212. The sixth response 942 represents the "App Page" 942 selection. As in FIG. 9D, the "App Page" action button 942 allows the application developer 116 to select an existing saved key-value pair or enter a new key-value pair that enables an application 112 user to be directed by the ROKO SDK conversation 201 to a certain page within the mobile application. Here also, the "New" option located above the "KEY" and "VALUE" input boxes is selected, which means the application developer 116 is entering a new key-value pair.

Figure 9F:
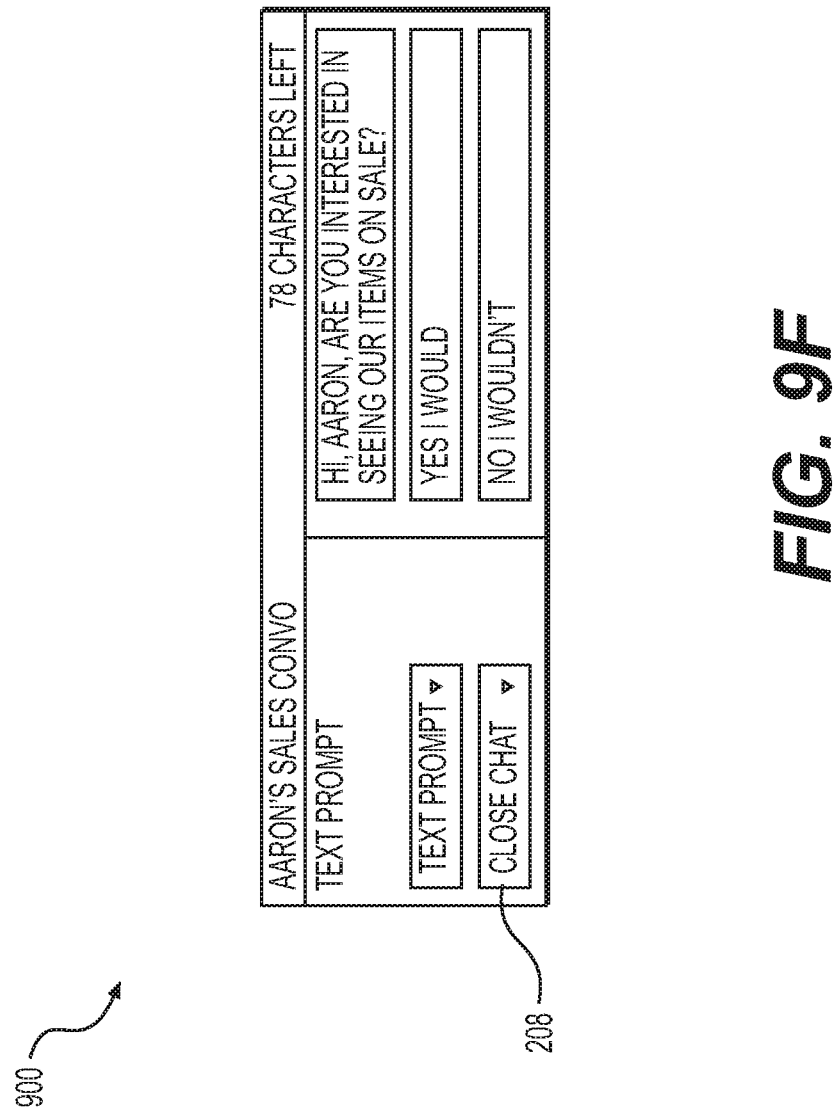
FIG. 9F is an illustrative computing environment including an illustrative portion of the FIG. 2 user interface for an application developer to enter data associated with interactions within the conversation.

FIG. 9F is an illustrative computing environment 900 including an illustrative a portion of a ROKO SDK/API UI 203 for an application developer 116 to enter data associated with interactions within the conversation 201 as shown in FIG. 2. In this instance, the "Close Chat" 208 selection is associated with the application 112 user data selection in the ROKO SDK conversation 201, of the "No I wouldn't" response in response to the first prompt "Hi (Username), are you interested in seeing our items on sale?" The "Close Chat" 208 selection can simply trigger the ROKO SDK 110 to close the particular conversation 201 and return the application 112 user to the same page they were on when the conversation 201 was initiated. When an application 112 user selects this option, the ROKO SDK transmits a "Completed" status to ROKO Analytics 290. In this example of the ROKO SDK 110, no additional branch of the conversation tree 210 is created if the "Close Chat" action button is selected.

FIG. 9G is an illustrative computing environment 900 including an illustrative portion of a ROKO SDK/API UI 203 for an application developer 116 to create a conversation 201 shown in FIG. 2 and to receive a display as a preview of user interface 216 of an application 112 on which the conversation 201 is launched. In this example, the preview screen for the application developer 116 is shown on the display 216; in this example, the following are data entries included in a sample conversation 201: first prompt 204 data entry of "Hi Aaron, are you interested in seeing our items on sale?" 204, first response 206 data entry of "Yes I would" 207 and second response 208 data entry of "No I wouldn't" 209, below as the binary data selection from which the user of the mobile application 112 can select.

Figure 10:
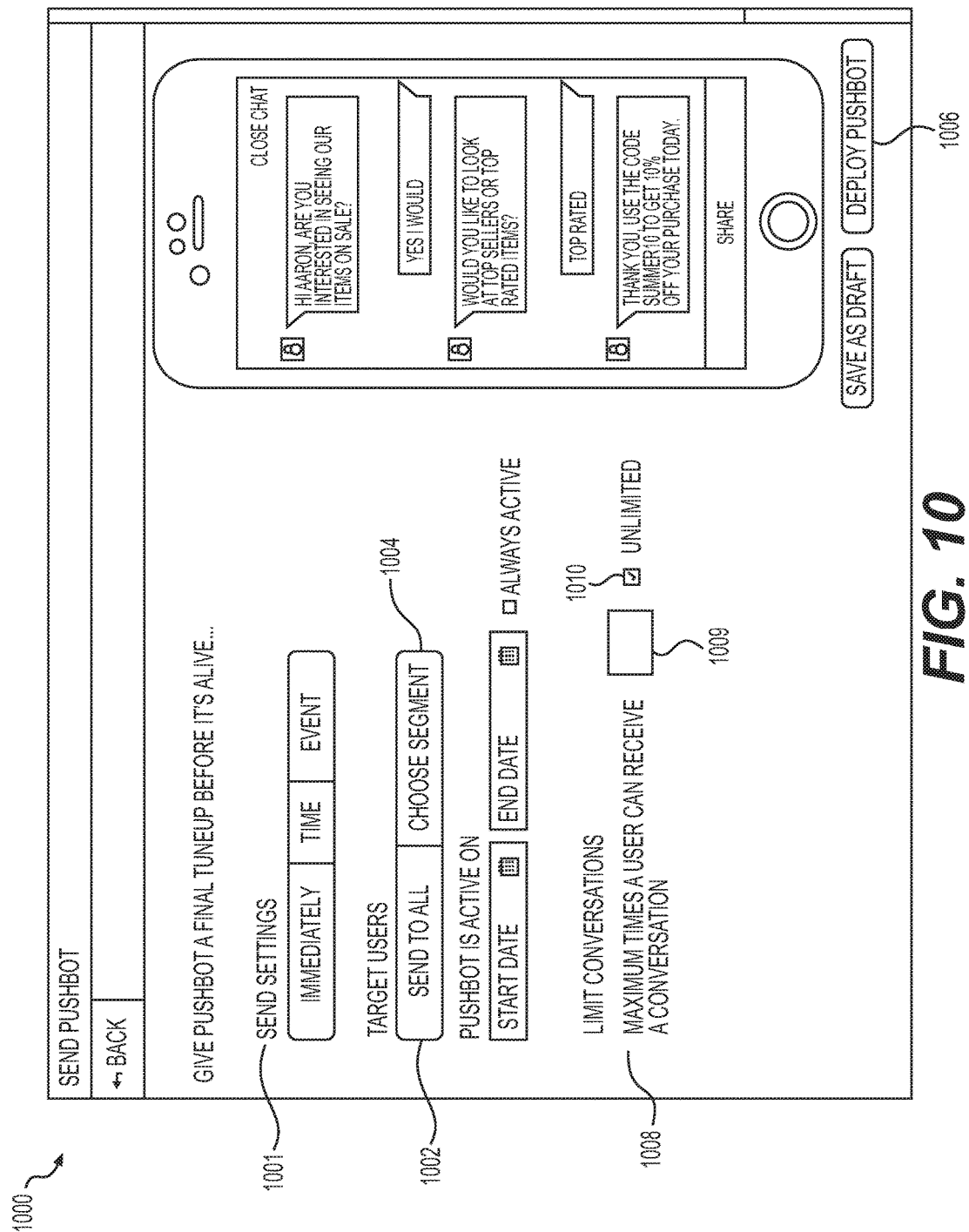
FIG. 10 is an illustrative computing environment including an illustrative user interface for an application developer to enter data about the launch of the conversation and to receive a display as a preview of a user interface of an application on which the conversation is launched.

FIG. 10 is an illustrative computing environment including an illustrative ROKO SDK/API UI 203 for an application developer 116 to enter data about the launch of the conversation 201 and to receive a display 218 as a preview of user interface an application 112 on which the conversation 201 is launched. In this example, another page of the ROKO SDK user interface 203 provides several options for the application developer 116 before pushing the completed conversation 201 to the application 112 users. The three available options for "Send Settings" are "Immediately," "Time," and "Event." For the first option, the application 112 users can receive the conversation 201 once the application is opened. In the second, the application 112 users can receive the conversation 201 only on a specific date, which the application developer 116 can select by using the "Start Date" and "End Date" options provided below the target user settings. In the third option, the application users can receive the conversation 201 once an application event triggers the transmission of the conversation 201. Multiple events can be linked together to target specific user behaviors. The Send Settings 1001 option provides a variety of triggers for the ROKO SDK 110 to launch the conversation 201 in the application 112. While the Send Settings show three alternative options including Immediately, Time and Event, the data provided to trigger a conversation 201 also can be generically referred to as an indication to launch the conversation 201. The ROKO SDK 110 can also provide an option for the application developer 116 to send the conversation 201 to one of at least two groups of application 112 users via the "Send To All" 1002 or "Choose Segment" 1004 buttons. In the latter user group, in this example, certain users can be vetted based on segment data associated with the profile of users of the applications 112. The segment data can be used to apply predetermined criteria to make the conversation 201 available to individual users of the application 112. Examples of such criteria can include application 112 users who have not yet made a second application 112 purchase from the application developer 116, who have not visited the application 112 for a period of time or who have reached a level of activity to justify additional more robust conversations 201. The use of segments for supporting conservation 201 availability by the ROKO SDK 110 is optional and can be used in some examples, but conversations 201 which do not include segments as criteria are within the scope of the invention. In further examples, the ROKO SDK 110 can enable the application developer 116 to create a new user segment. Once the settings selection has been completed, the application developer 116 can distribute the conversation 201 by selecting the "Deploy PushBot" button 1006. In an additional example, the ROKO SDK 110 enables the application developer 116 to put the conversation 201 on hold by, for example, activating navigational options on the ROKO SDK user interface 203 (in this case boxes can be checked, which such labels as "Always active" to the right of the "Start Date" and "End Date" buttons). In addition, the use of user properties derived from the mobile application developer 116 can be processed in association with segments 1004 and/or the use of segments 1004, as well as the process as shown in FIG. 2 and FIG. 9 in which a response is saved as a user property can be used to save one or more user propert(ies) with the user profile and to derive segments 1004 based on the saved individual or combination of user propert(ies) saved for each user of applications 112 or 113.

In one example of the implementation of conversations 201, where there are multiple ROKO SDK conversations 201 active for deployment to the same user segment 1004 of an application 112, a conflict handling modality can be provided. The previous example, allows the application developer 116 to decide which users of the application 112 should receive the conversations 201. The conflict handling modality identifies conversations 201 that are incompatible with the current send settings. The application developer 116 can then select a conversation 201, which is compatible with the current send settings, to be deployed to the users of the application 112. If a user has already previously received the conversation 201, the user can receive a new conversation 201, which typically applies to users with multiple active conversations 201. Once the settings selection has been completed, the application developer 116 can distribute the conversation 201 by selecting the "Deploy PushBot" button 1006. If the developer decides to put the conversation 201 on hold, the developer can simply check the box labeled "Always active" to the right of the "Start Date" and "End Date" buttons.

In addition, the mobile application developer 116 is also presented with an option 1008 of designating the maximum number of times a user can receive a conversation 201, including data entry options shown of a data entry field 1009 in which to enter a numerical value or a check box 1010 to indicate the selection of unlimited. FIG. 10 presents a variety of approaches for providing additional options to the launch of conversations 201, and in other examples, these options are optional and are not needed for an example to be within the scope of the invention.

Figure 11:
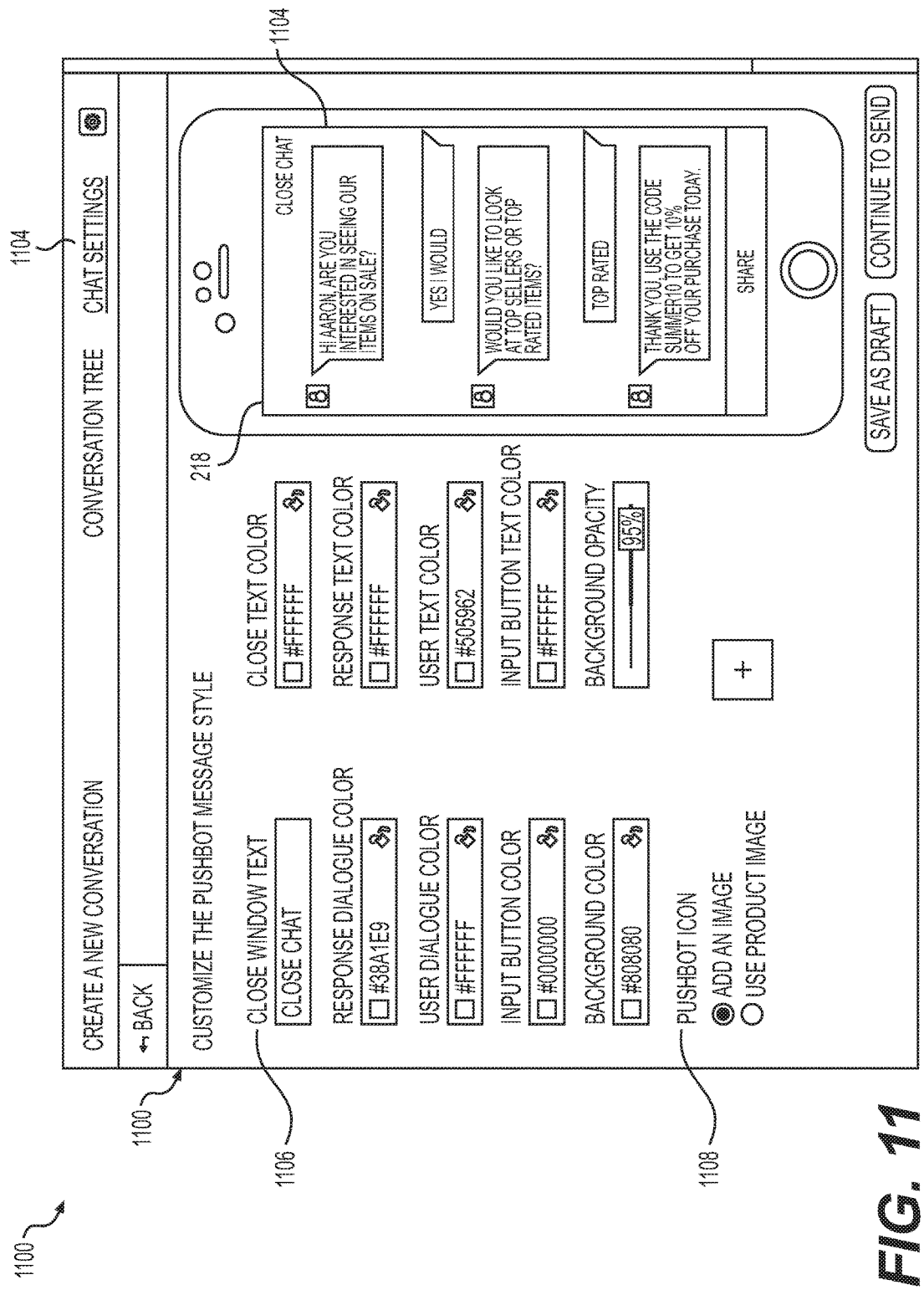
FIG. 11 is an illustrative computing environment including an illustrative user interface for an application developer to customize the conversation and to receive a display as a preview of a user interface of an application on which the conversation is launched.

FIG. 11 is an illustrative computing environment 1100 including an illustrative ROKO SDK/API UI 203 for an application developer 116 to customize the conversation 201 and to receive a display 218 as a preview the conversation 201 on the mobile application 112. FIG. 11 shows a customization area 1102, as indicated by the highlighted option "Chat Settings"1104. Area 1102 also allows the mobile application developer 116 to select, adjust, or modify the conversation style settings to ensure compatibility with the application's brand or image, desired conversation objective, or targeted application user behavior, among other criteria. The conversation settings determine the look of the conversation 201 as it appears on the application 112 users' device screen. For this example, there are multiple options for settings that can be configured by the application developer 116, including: response dialog color, user dialog color, input button color, background color, close text color, response text color, user text color, input button text color, and background opacity. The option on the first settings column ("Close Window Text" 1106) can allow a mobile application developer 116 to input the text that an application 112 user sees on the button for closing the conversation 201. Also included in the first settings column, there is an option for the application developer 116 to select and add a conversation icon (labeled "PushBot Icon" 1108) in the form of an image such as a product image. Once the settings have been configured, they can be saved as default settings when creating a conversation 201. As such, the conversation style need not be updated each time a new conversation 201 is created. These settings do not affect previously created conversations 201. As in the other sections or pages of the ROKO SDK 110, the display 218 as shown in FIG. 2 allows the mobile application developer 116 to preview a conversation 201 configuration as the conversation 201 settings are being selected, changed, or adjusted. The availability of conversations 201 settings as well as the types of settings and implementation of those settings on the ROKO SDK user interface 203 can vary, and variations or even where setting options are not made available to the mobile application developer 116 are within the scope of the invention.

Figure 12A:
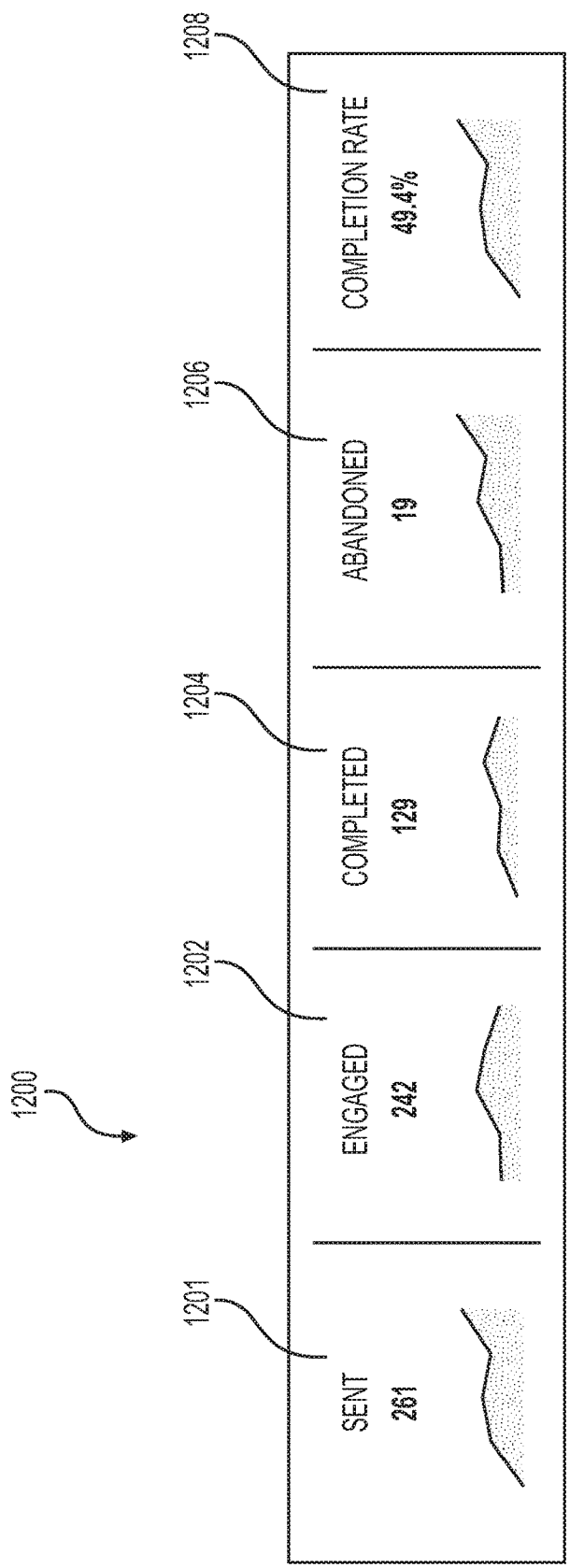
FIG. 12A is an illustrative computing environment including an illustrative user interface for an application developer to receive a display of sample conversation analytics.

FIG. 12A is an illustrative computing environment 1200 including an illustrative ROKO SDK/API UI 203 for an application developer 116 to receive a display of sample conversation analytics. The previous example shows a sample of conversation statistics data that can be viewed by the application developer 116 in the ROKO SDK conversation 201 level statistics dashboard (shown in FIG. 2 as Analytics 290). In this example, the ROKO SDK statistics can be tracked at two distinct levels in order to provide an overview of one or more conversations 201, as well as to provide data at each individual tier of each conversation 201. In FIG. 12A, the number in the Sent display 1201 is the total number of conversations 201 opened on a user's mobile device. The number in the "Engaged" display 1202 is the total number of conversations 201 opened on an application 112 or 113 user's device or platform in which the user answered the first prompt in the conversation 201. The number in the "Completed" display 1204 is the total number of conversations 201 opened in which the user answered the last prompt of a conversation 201. The number in the "Abandoned" display 1206 is the total number of conversations 201 in which the user closed the conversation window before responding to any prompts. The percentage shown in the "Completion Rate" display 1208 is obtained by converting the quotient of the numbers indicated in displays 1204 and 1201 to a percentage.

The trend lines below the numbers in each display 1201, 1202, 1204, 1206 and 1208 can represent the corresponding conversation 201 statistics data values as a function of time. The time range covered in the trend lines can be based on the date interval selected by the mobile application developer 116. An example of trend rules used by the ROKO SDK 110 for generating or representing the trend lines is as follows: (1) take total time in days and divide by 6 (to create 7 data points); (2) create a data point for each one of those intervals (rounding off, if needed; e.g., "last 30 days/6=5"); (3) 5 days per interval, e.g., days 1, 6, 11, 16, 21, 26, 31; (4) first data point should be activity/count on day 1; second data point should be the value at day 6; third data point should be the value at day 11; and final data point should be the total at the end of period covered.

Figure 12B:
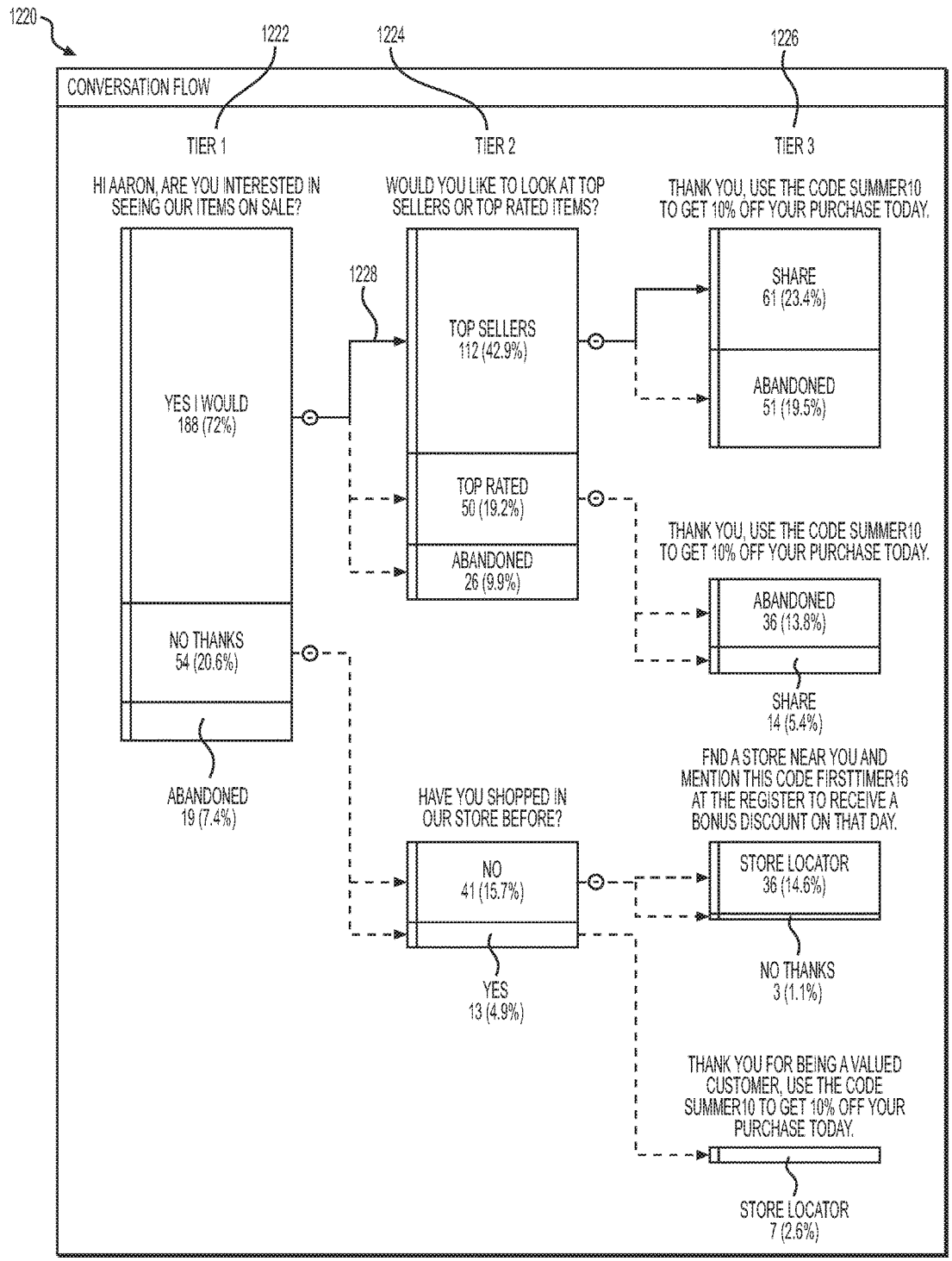
FIG. 12B is an illustrative computing environment including an illustrative user interface for an application developer to receive a display of interactions with various tiers for conversation analytics.

FIG. 12B is an illustrative computing environment 1220 including an illustrative ROKO SDK/API UI 203 for an application developer 116 to receive a display of interactions with various tiers for conversation analytics. The statistics data viewable to the application developer 116 on the ROKO SDK user interface 203 can be presented in various ways. In one example, a visual portion shows first, second and third-tiers 1222, 1224 and 1226, respectively, of the conversation 201 and for each tier, a breakdown of actions received by the ROKO SDK conversation 201 from the user of the application 112 or 113 on which the conversation 201 is run. In FIG. 12B, each tier is displayed with data entry corresponding to each prompt and response within the conversation as well the resulting data input received by the ROKO SDK conversation 201 from the user of the application 112 interacting with each tier. The visual portion shown FIG. 12B also includes textual and percentage data corresponding to each action received by the ROKO SDK conversation 201. For each additional tier, in this example, 1224 and 1226, the layering relative to the tier 1 response that triggered the tier 2 response is represented by a presentation of a flow between tiers, such as for example, connector 1228. In addition, application 112 users' action, which represent the majority of the close actions, can appear on the top of the column. Also, in this example, the percentages of data shown indicate the percentage based off the total conversations 201 launched by users of the application 112 or 113 rather than a percentage relative to a previous tier. As one example, in tier 1 column 1222, the prompt is "Hi (Username), are you interested in seeing our times on sale?" The analytics shown in FIG. 12B indicate that where the application developer 116 provided responses of "Yes, I would" as well as other responses, with the "Yes, I would" response selected by 72% of the users of applications 112 who received the conversation 201. Further, for example, in Tier 2 column 1224, the prompt is "Would you like to look at top sellers or top rated items?" The analytics shown in FIG. 12B indicate that where the application developer 116 provided response options of "Top Sellers" or "Top Rated," the "Top Sellers" response is shown as attributable to 42.9% of total users of the application 112 or 113 who received the conversation 201. In alternative examples, there can be variations on the calculations of the analytics provided as within the scope of the invention. In addition, other actions by users of the applications 112, such as the abandonment of the conversation 201 also can be shown on the conversation 201 statistics. In addition, the statistics representing the selection of responses by users of the application 112 or 113 can be aggregated into data which is then used to create or suggest edits to existing or future conversation 201 prompts, responses, and events, as well as user propert(ies) and/or segments. The statistics can inform new, edited or replacements to existing conversations or suggestions for data within conversations or the existence or types of conversations 201 themselves. The use of the statistics also can be processing with AI processing to automate one or more portions of the selections of individual and combinations of data associated with or indicated by conversation 201, types of conversations, or the creation, edit or suggested generation of new forms of conversations 201, as well as influencing the process by which the conversations 201 are created through the ROKO SDK/API UI 203. The FIG. 12B approach to the display of statistics for the ROKO Analytics 290 are exemplary of a variety of visual and content presentations of statistics regarding the conversations 201, and a variety of displays for the ROKO Analytics 290 are within the scope of this invention.

Figure 13A:
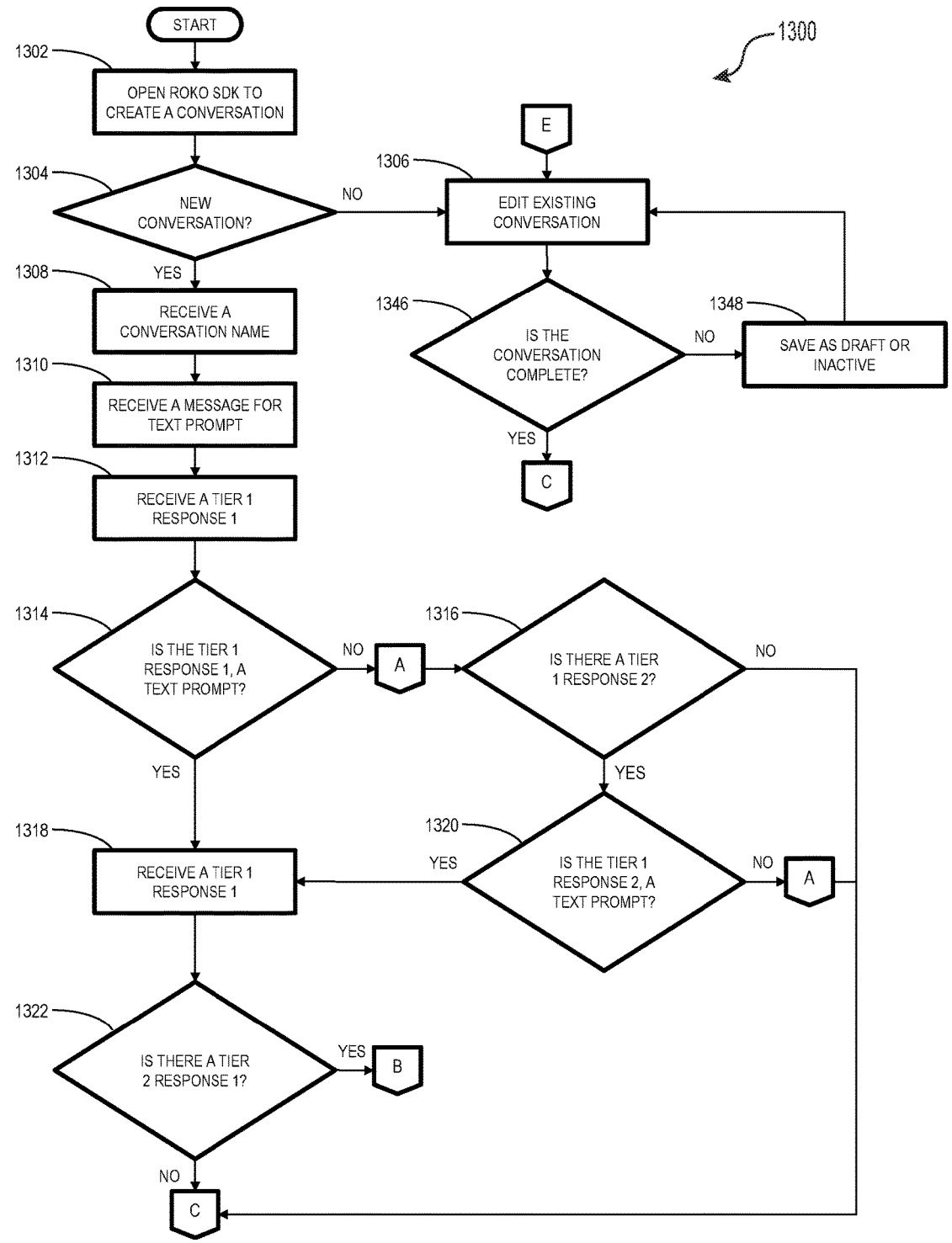
FIG. 13A is a flow diagram that shows a process for creating a conversation.

As shown in FIG. 13A, the ROKO SDK conversation 201 is first loaded to create a conversation 201 at 1302. A conversation 201 can be created by opening a new conversation file at 1304, or by editing an existing conversation file at 1306. The functionality provided for editing conversations 201 can support edits occurring during the conversations 201 being active so that the edits can occur approximately on a real-time basis. In this manner, the application developer 116 can adjust or edit the conversations 201 even while users of the applications 112 are actively engaged with a conversation 201. Real-time functionality can also enable additional levels of value and impact for conversations 201, as well as additional analytics resulting from the interactions with the users of the applications 112 during adjustments to conversations 201. Additionally, versions of conversations 201 can be stored and supported by the ROKO SDK 110 so that earlier versions can provide an additional form of conversation 201 adjustments and suggestions.

If a new conversation file is opened, the ROKO SDK/API UI 203 for application developer 116 receives a name of the conversation at 1308. Once the conversation 201 is named, a text message to be used as a prompt for display on the application 112 is received on the UI 203 at 1310, as well as a Tier 1 response 1 (an example of a Tier 1 response is the response "Yes I would" 208, which is one of the responses provided for the prompt "Hi (Username), are you interested in seeing our items on sale?" 254 shown in the first conversation tree branch labeled "Aaron's Sales Convo" 252 in FIG. 2) at 1312. The ROKO SDK 110 then receives input from the application developer 116 to determine if the Tier 1 response ("tier 1 response 1" in the Figures) is a text prompt at 1314. If it is a text prompt at 1314, the first-Tier 1 response data entry or selection is received at the UI 203 at 1318. After receiving the first-Tier 1 response, the ROKO SDK 110 determines if there is a Tier 2 response ("tier 2 response 1" in the Figures) at 1322. If there is a Tier 2 response at 1322 the process proceeds to subroutine B. Otherwise, the process moves to subroutine C. If the first-Tier 1 response is not a text prompt, the ROKO SDK 110 proceeds to subroutine A and then determines if there is a second-tier 1 response ("tier 1 response 2" in the Figures). If there is a second-tier 1 response, the ROKO SDK 110 determines if the second-Tier 1 response is a text prompt 1320. If the response is a text prompt, then the ROKO SDK 110 returns to step 1318. If the response is not a text prompt, the process moves to subroutine A and then to subroutine C.

Figure 13B:
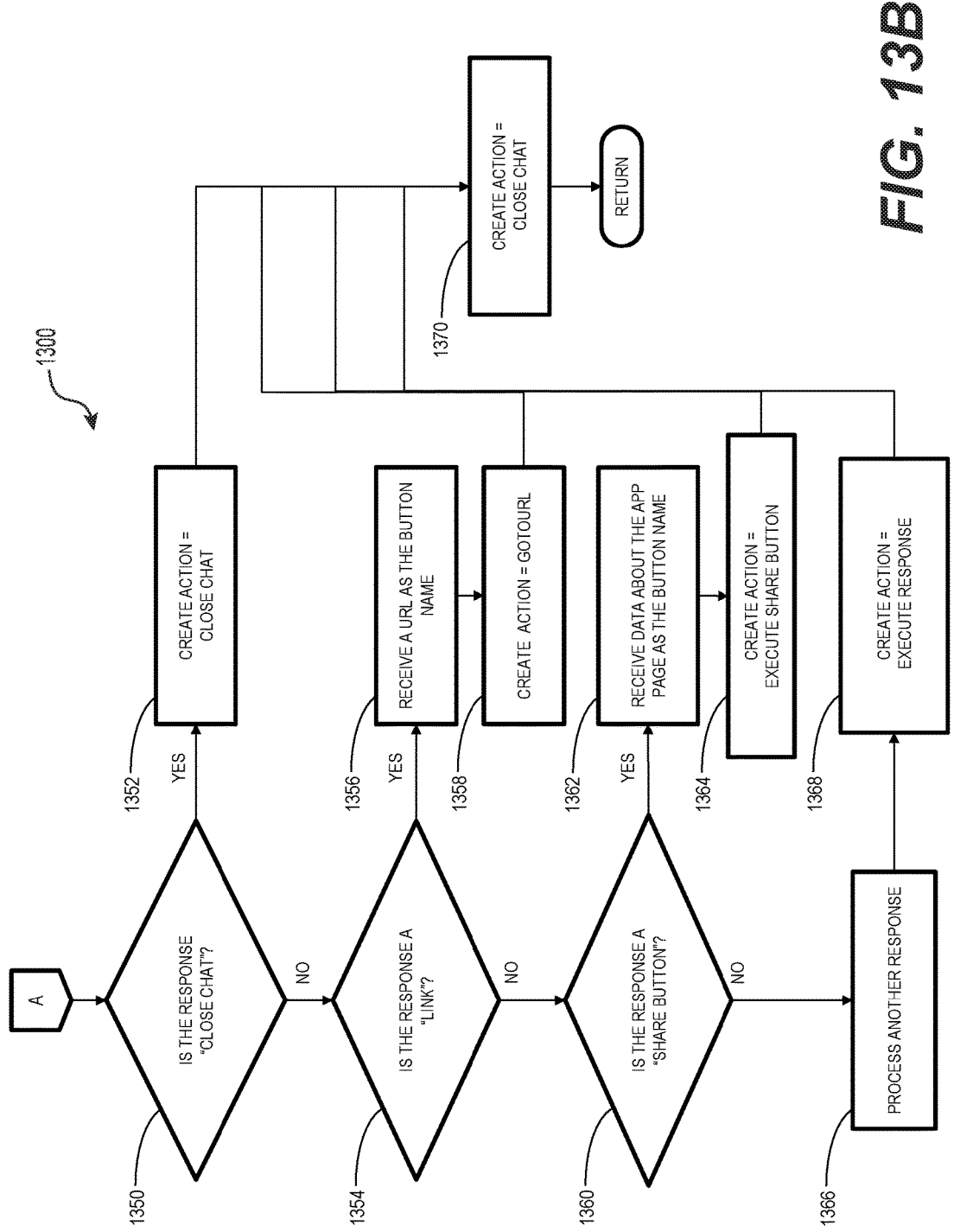
FIG. 13B is a flow diagram for a subroutine A of FIG. 13A.

FIG. 13B is a flow diagram for the subroutine A of FIG. 13A, or when a response is not a text prompt, for the ROKO SDK conversation 201 creation and deployment process. Subroutine A executes various processes that typically occur at the last conversation tier in a conversation, e.g., at either one of the two Tier 3 conversation tiers "Top Sellers" 212 and "Top Rated" 214 shown in FIG. 2. Subroutine A processes, such as those that occur upon selection by the application user of the action buttons "Close Chat," "Share," or "Link" are the final responses provided to the application user to: (a) close the conversation ("Close Chat"); (b) allow the user to share, for example, a promotional offer to other users ("Share"); and (c) allow the application user to be directed to a webpage by selecting, such as by clicking or pressing on, a link ("Link"). In this subroutine A, in the first step, the ROKO SDK 110 determines if the response is "Close Chat" at 1350. If it is a "Close Chat" at 1350, a close action corresponding to "Close Chat" is generated at 1352. If it is not a "Close Chat" at 1350, then the ROKO SDK 110 determines if the response is a "Link" at 1354. If it is a "Link" at 1354, a URL is received as the button name for the "Link" response at 1356, followed by generation of a close action for the "GoTo URL" action at 1358. If the response is determined not to be a "Link" in step 1354, then the ROKO SDK 110 in the ensuing step determines if the response is a "Share Button" at 1360. If it is, data about the application page is received as the button name at 1362, followed by creation of a close action for executing the share button at 1364. Where the response is a "Share Button" as determined by the ROKO SDK 110 in step 1360, in one example, the following additional processing can be executed by the ROKO SDK 110. The application developer 116 can select either a link or an in-app page, or close the chat once the share function is closed. When the user selects the "Share Button" event, the ROK O SDK conversation 201 can trigger a call to display the applications configured on the application developer UI 203. In this example, users of the application 112 can be supported to share information about the ROKO SDK conversation 201 that they might find relevant, interesting, or important, for example, a promo code being offered for 10% off. A user can then share the promo code out across various social media channels or through email and SMS. The application developer 116 can identify either a URL or an in-app page on the application developer UI 203 to direct the user to once they close the Share UI. If no page is identified, the chat is closed and the user is dropped on the same page as the user was on when the user encountered the ROKO SDK conversation 201. If the response is not a "Share Button," another response is processed at 1366, followed by the creation of a close action for executing the response at 1368. Following each of steps 1358, 1364, and 1368, a close action corresponding to "Close Chat" is created 1370 after which subroutine A proceeds as shown in FIG. 13A.

Figure 13C:
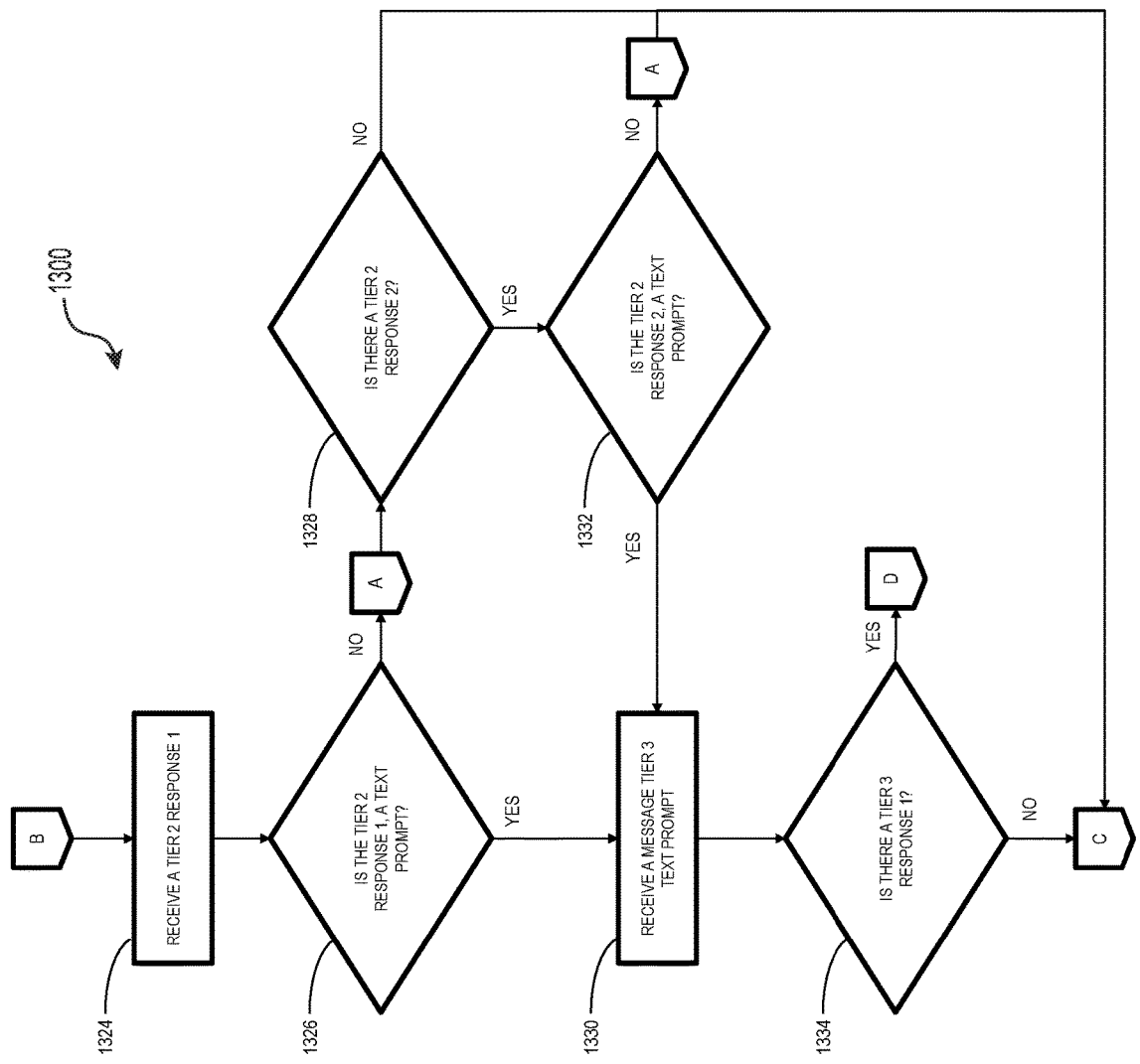
FIG. 13C is a flow diagram for a subroutine B of FIG. 13A.

FIG. 13C is a flow diagram for the subroutine B of FIG. 13A, illustrating when there is an additional response, for the ROKO SDK conversation 201 creation and deployment process. A first-Tier 2 response is received at 1324, and then the ROKO SDK 110 in the ensuing step determines if it is a text prompt at 1326. If it is a text prompt at 1326, a Tier 3 text prompt is received at 1330. If it is not a text prompt at 1326, then the ROKO SDK 110 moves to subroutine A and then the ROKO SDK 110 determines if there is a second-Tier 2 response at 1328. If there is a second-Tier 2 response at 1328, the ROKO SDK 110 determines if the second-Tier 2 response is a text prompt at 1332. If it is a text prompt at 1332, the ROKO SDK 110 moves to step 1330, in which a Tier 3 text prompt is received. If a Tier 3 text prompt is not received, the ROKO SDK 110 advances to subroutine A and then to subroutine C. From step 1330, the ROKO SDK 110 determines if there is a first-Tier 3 response at 1334. If there is a first-Tier 3 response at 1334, then the ROKO SDK 110 moves to subroutine D. If there is not a first-Tier 3 response at 1334, then the ROKO SDK 110 moves to subroutine C.

Figure 13D:
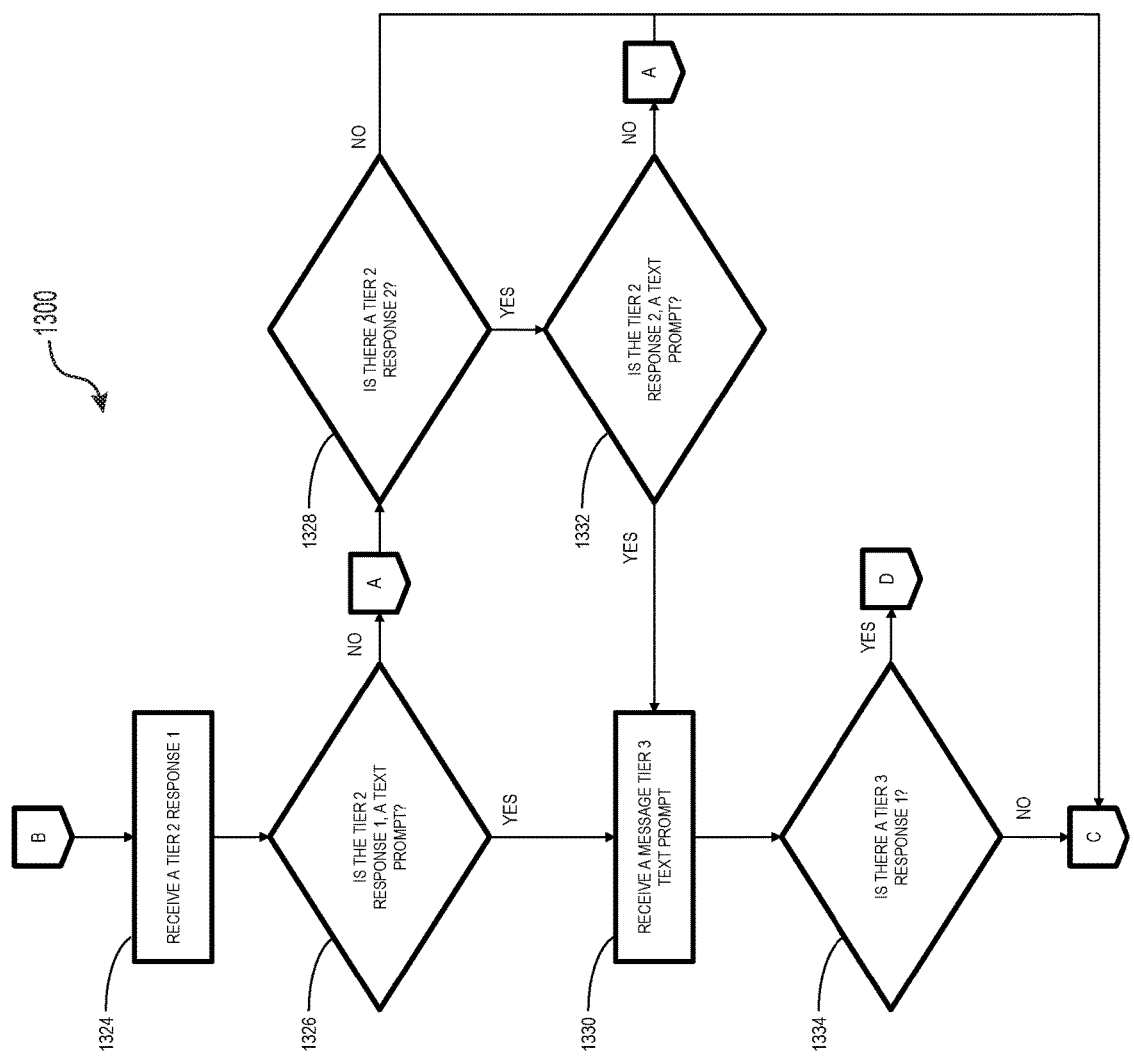
FIG. 13D is a flow diagram for a subroutine C of FIG. 13A.

FIG. 13D is a flow diagram for the subroutine C of FIG. 13A, or when there is not an additional response, for the ROKO SDK conversation 201 creation and deployment process. The conversation 201 is saved at 1372 and the ROKO SDK 110 determines whether the saved conversation 201 is Active at 1374. If the conversation 201 is Active it is saved as Active at 1376, and then the conversation 201 is pushed or launched at 1384 to application 112. If the conversation 201 is non-Active, the conversation status is set as Pending ("Pending" can in this example indicate that the conversation 201 has been completed and is scheduled to be sent at a future date), Draft, or Inactive at 1378. When a non-Active conversation 201 is re-opened at 1380 (e.g., at 1306 in FIG. 13A), the status of the conversation 201 is again determined relative to whether it is Pending at 1382. If the status is not Pending, then the ROKO SDK 110 continues processing with subroutine E. If the conversation 201 has a status of Pending, the conversation 201 is then launched at 1384.

Figure 13E:
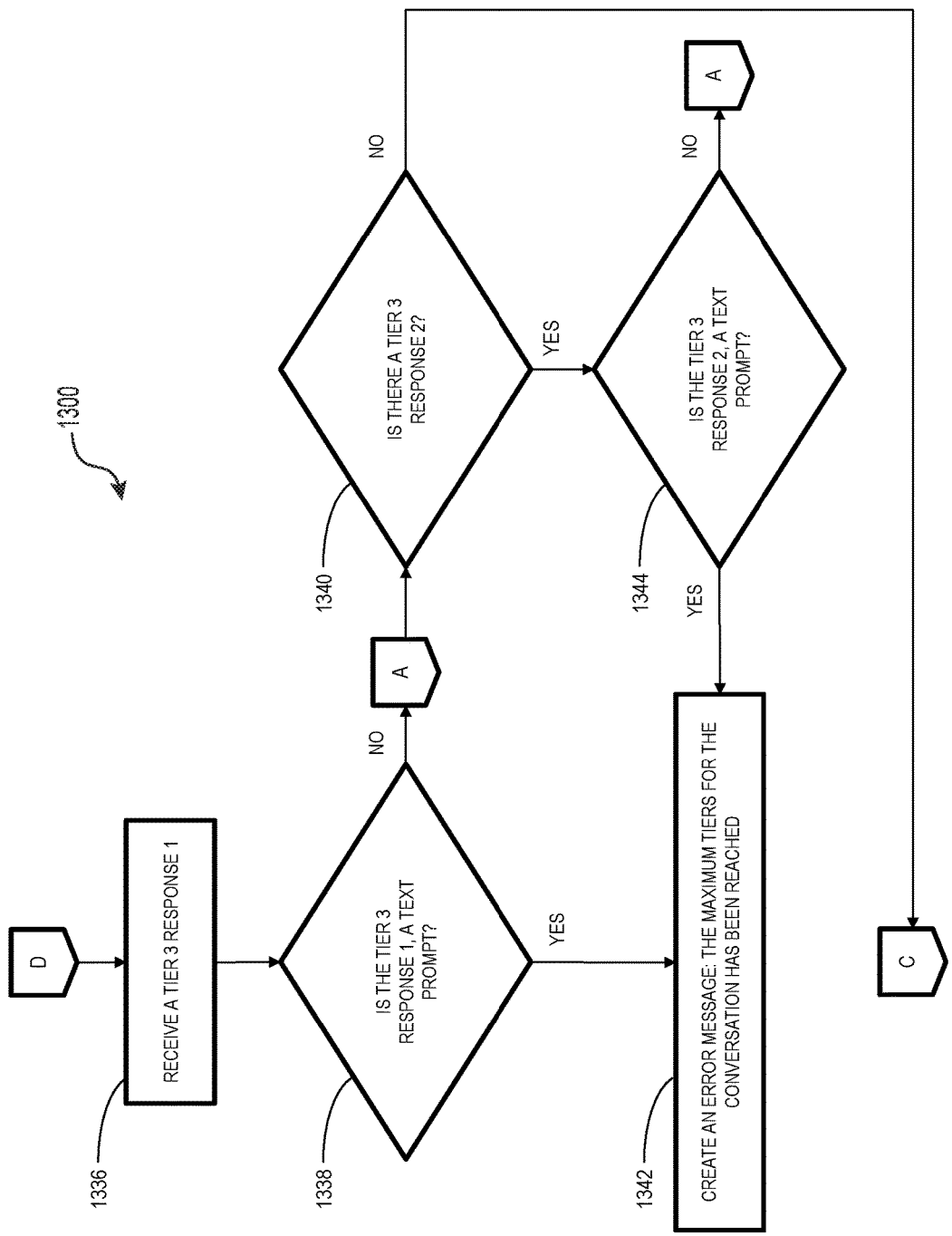
FIG. 13E is a flow diagram for a subroutine D of FIG. 13C.

FIG. 13E is a flow diagram for the subroutine D of FIG. 13C, or similar to the subroutine B, when there is an additional response, for the ROKO SDK conversation 201 creation and deployment process. A Tier 1 third response ("tier 3 response 1" in the Figures) is received at 1336. The ROKO SDK 110 then determines if the third-tier first response is a text prompt at 1338. If it is not a text prompt, the ROKO SDK 110 continues processing at subroutine A. If there is a third-tier second response as assessed at 1340, the ROKO SDK 110 determines whether the response is a text prompt at 1344. If it is a text prompt, the ROKO SDK 110 creates an error message, such as: "the maximum tiers for the conversation has been reached" at 1342. If it is not a text prompt, the ROKO SDK 110 continues processing at subroutine A. If a third-tier second response is not present, the ROKO SDK 110 continues processing at subroutine C.

In this example of a process for creating a conversation 201, there are a maximum number of tiers, responses, and text prompts for the conversation 201. However, in other examples, the maximum number of tiers, responses and text prompts can be changed to suit the objective of the conversation and to encourage the exchange of data by the application 112 user with an appropriate number of layer of interactions within the conversation 201. Other examples of maximums can be less than three tiers, or greater than three tiers, and in further examples, there can be no maximums for any of the features of the conversations. Rather, the number of interactions within the conversation can be determined by the application developer 116 during creation of the conversation 201.

In this example of a process for creating a conversation 276, there are a maximum number of tiers, calls-to-action and text prompts for the conversation 276. However, in other examples, the maximum number of tiers, calls-to-action and text prompts can be changed to suit the objective of the conversation and to encourage the exchange of data by the mobile application 112 user with an appropriate number of layers of interaction within the conversation 276. Other examples of maximums can be less than three tiers, or greater than three tiers, and in further examples, there can be no maximums for any of the features of the conversations. Rather, the number of interactions within the conversation can be determined by the mobile application developer 116 during creation of the conversation 276.

Figure 14A:
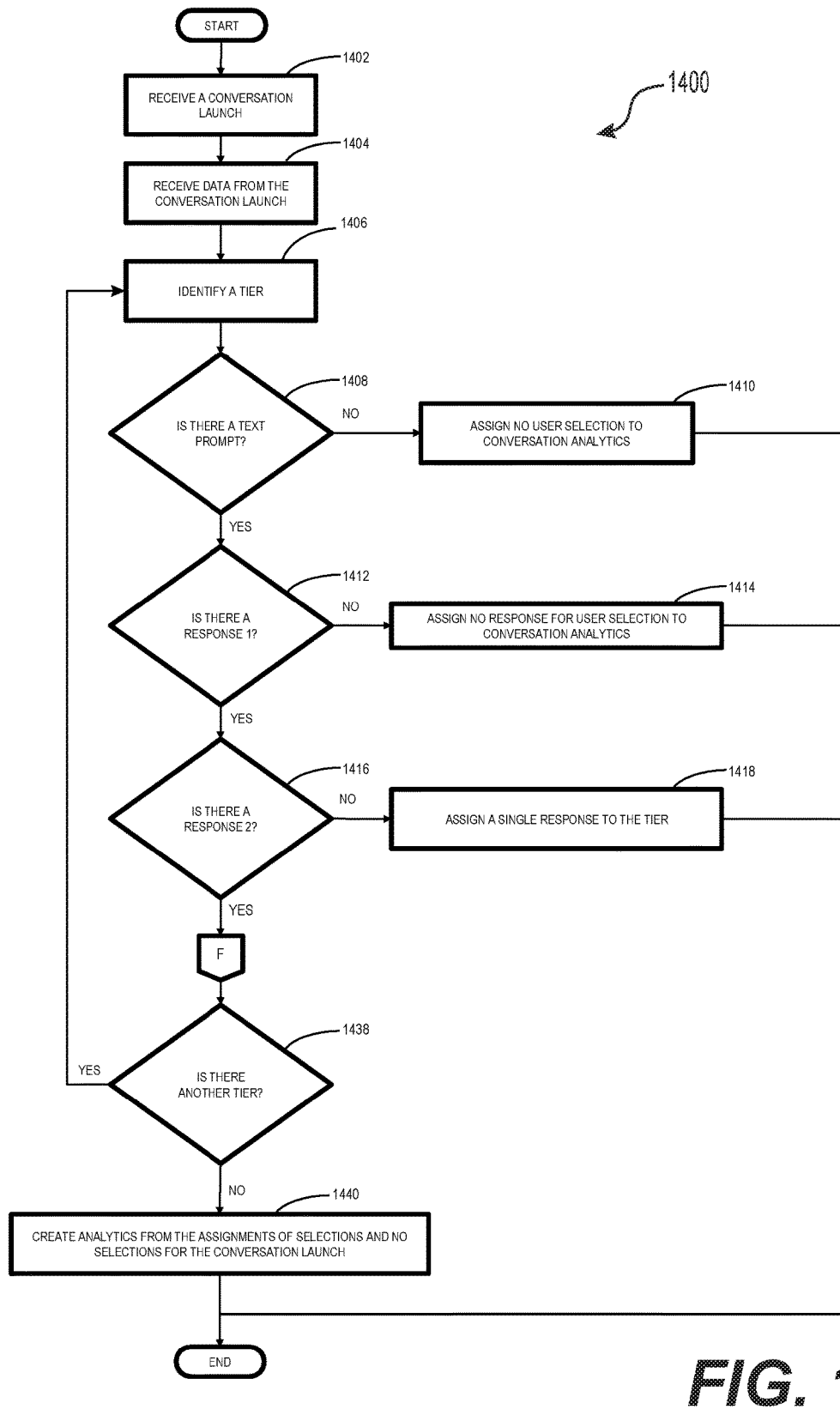
FIG. 14A is a flow diagram that shows a process for creating analytics based on conversations.

FIG. 14A is a flow diagram that shows a process for creating analytics based on conversations 201 at 1400. After a conversation 276 launch (e.g., 1384 in FIG. 13D) is received by the ROKO API 110 at 1402, data from the launch is also received at 1404. A tier of the conversation 276 is then identified at 1406. The ROKO API 110 then continues processing by determining if a text prompt is present at 1408. If there is no text prompt, then the ROKO API 110 transmits and stores this information within a conversation analytics database at 1410. If there is a text prompt, then the ROKO API 110 determines if there is a first response 1412. If there is no response, then the ROKO API 110 assigns a no response to conversation analytics at 1414. If there is a first response, then the ROKO API 110 determines if there is a second response at 1416. If there is no second response, then the ROKO API 110 assigns a single response to the tier at 1418. If the ROKO API 110 determines that there is a second response 1416, the ROKO API 110 continues processing at subroutine F. Then, the ROKO API 110 determines whether there is another tier in the conversation 276 at 1438. If there is another tier, the ROKO API 110 continues processing at 1400 by returning to step 1406. The ROKO API 110 terminates processing by creating analytics from the assignments of selections and no selections for the conversation 276 launch at 1440.

Figure 14B:
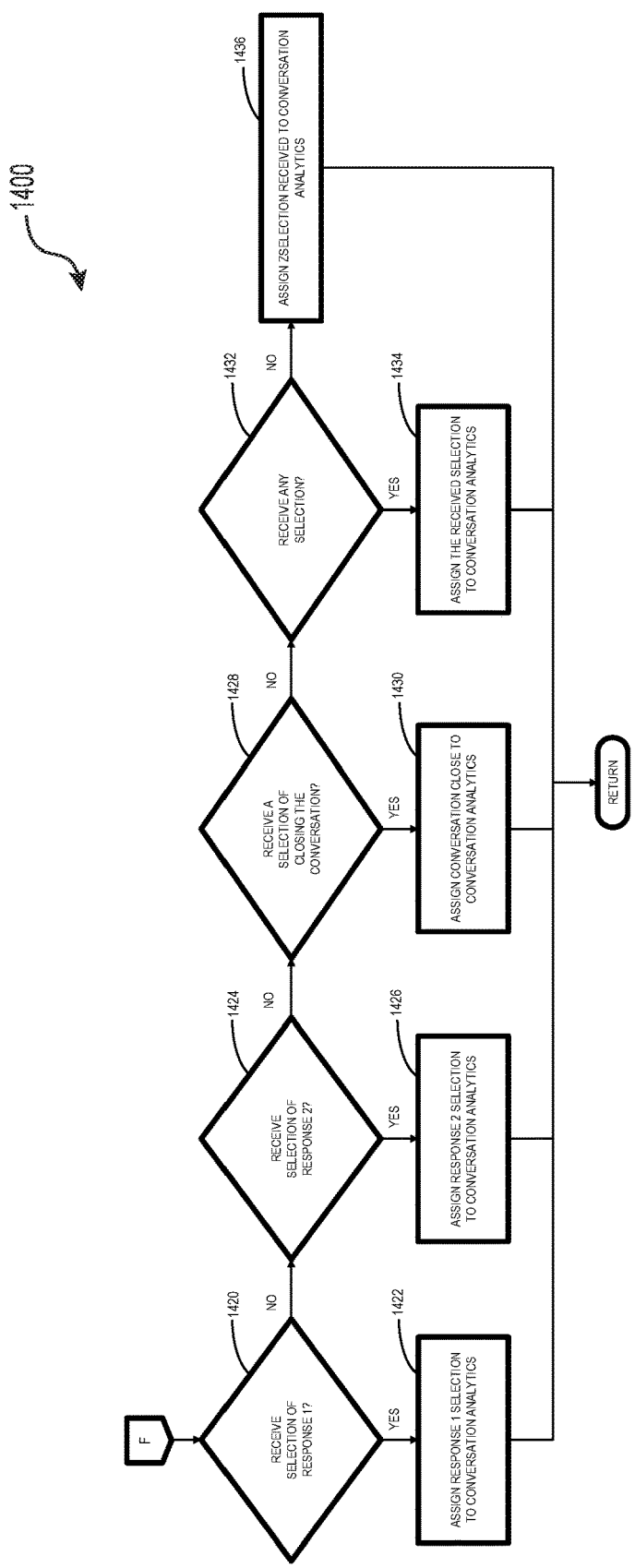
FIG. 14B is a flow diagram for a subroutine F of FIG. 14A.

FIG. 14B is a flow diagram for the subroutine F of FIG. 14A. If a second response is determined from step 1416, the ROKO API 110 determines if the first selected response is received at 1420. The ROKO API 110 then assigns the first selected response to the conversation and stores the assignment in the conversation analytics database at 1422. If the ROKO API 110 determines that there is no first response, the ROKO API 110 then determines whether there is a presence of a second response at 1424. If the ROKO API 110 determines that there is a second response, the ROKO API 110 then assigns the second selection to conversation analytics at 1426. If the ROKO API 110 determines that there is no second response, the ROKO API 110 then determines if a response for closing the conversation 276 is received at 1428. If the ROKO API 110 determines that there is a response for closing the conversation 276, the ROKO API 110 then assigns the closing action to conversation analytics at 1430. If the ROKO API 110 then determines that there are other received selections at 1432, the ROKO API 110 then assigns the received selections to conversation analytics at 1434. If there are no other selections, the ROKO API 110 then assigns again the absence of selection to conversation analytics at 1436. The ROKO API 110 then terminates processing of subroutine F by returning to the main process in FIG. 14A.

In addition, there a multiple approaches to using the ROKO Analytics 290 to measure the success of conversations 201, including multiple launches of a single conversation 201 (such as for example by multiple users of the applications 112 or 113), multiple launches of the conversation 201 based on different indications for launching the conversation 201 (such as for example, upon launch of the application, at a predetermined time after launch or based on an event as discussed above regarding FIG. 10), and comparing different conversations, such as conversation 201 versus 281, 282, 283, et seq. (not shown), including having a different number of tiers, prompts and/or responses or different data associated with one or more the components of the conversation 201.

Examples of using the ROKO analytics 290 for success metrics are now described. For comparisons of a multiple launches of a single conversation 201, user performance and engagement as a function of before and after launching the conversations 201 can be measured based on the following criteria: (a) average time the user spends engaged with the application (also referred to as "in-app") 112 or 113 before conversation 201; (b) average time in-app after conversation 201; (c) the number of times the user opens the application 112 or 113 before the conversation 201; (d) the number of times the user opens the application 112 or 113 after the conversation 201; (e) the conversion rate measured based upon a specific conversion objective before the conversation 201; (f) the conversion rate (measured based upon a specific conversion objective) after the conversation 201; (g) the conversation reply rate; ☐ and (h) the conversation abandonment rate.

For comparisons of a multiple conversations with respect to each other, such as different conversations 201A and 201B, or conversations A and B where some prompts and/or responses are different between the conversations but there is some overlap based on, for example, where a conversation is edited, user performance can be measured based on: (a) conversation 201A engagement rate versus conversation 201B engagement rate; (b) conversation 201A completion rate versus conversation 201B completion rate; (c) conversation 201A abandonment rate versus conversation 201B abandonment rate; (d) conversation 201A conversion rate versus conversation 201B conversion rate (e) conversation 201A time spent in app after receiving versus conversation 201B time spent in app after receiving; (f) conversation 201A # of times opening app after receiving versus conversation 201B time spent in app after receiving; and (g) conversation 201A abandonment rate versus conversation 201B abandonment rate.☐

For comparisons of a multiple conversations with respect to each other, such as different conversations 201A and 201B, including a comparison of all conversations 201 launched by a mobile application developer 116 for one or more applications 112 or 113 available on the ROKO platform, user performance can be measured for example based on: (a) engagement rate of conversation 201 based on conversation tiers; (b) engagement rate of conversation 201 based on average characters in prompt; (c) engagement rate of conversation 201 based on average words in prompt; (d) engagement rate of conversation 201 based on images in prompt; (e) completion rate of conversation 201 based on conversation tiers; (f) completion rate of conversation 201 based on average characters in prompt: (g) completion rate of conversation 201 based on average words in prompt; (h) completion rate of conversation 201 based on images in prompt; (i) conversion rate of conversation 201 based on conversation tiers; (j) conversion rate of conversation 201 based on average characters in prompt; (k) conversion rate of conversation 201 based on average words in prompt; (l) conversion rate of conversation 201 based on images in prompt; (m) abandonment rate of conversation 201 based on conversation tiers; (n) abandonment rate of conversation 201 based on average characters in prompt; (o) abandonment rate of conversation 201 based on average words in prompt; and (p) abandonment rate of conversation 201 based on images in prompt.

The ROKO analytics 290 also can be used as a measure of sentiment and user behavior as based on triggering conversation at key decision points in the application, such as questions related to user preferences, demographics, and user sentiment. In addition these user preferences, demographics, and user sentiment can be incorporated in user interfaces 203 to assist the mobile application developer 116 in creating future conversations 116. In addition, user segments can be updated dynamically as users respond to conversations 201 based on the following exemplary processing: the application of regression analysis involves identifying the relationship between a dependent variable collected from InstaBot to one or more independent variables from user behavior, user flow, or other known data, or the correlation of user segments as defined by 201 conversation user properties 108 in order to predict behavior of one segment through another segment.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
one or more processors; and
a memory including computer-executable instructions that, when executed, cause the processor to:
launch a conversation configured for installation in an application, the conversation including a plurality of prompts, the plurality of prompts including at least a first prompt and a second prompt, a plurality of responses, the plurality of responses including at least a first response associated with the first prompt, and at least a second response associated with the second prompt, and a close action;
receive an indication for each of a plurality of launches of the conversation in the application;

for each of the plurality of launches:
receive at least a first responsive data associated with the first response, the first responsive data including one of a plurality of responsive data types, the responsive data types including one of a data entry, a data selection, an action or an abandonment of the conversation;
generate a first metric, the first metric including a first metric count for each of the plurality of responsive data types of the first response;
aggregate the first metric count for each of the plurality of responsive data types of the first response;
detect whether the second response is received; and
upon detection of a receipt of the second response:
receive at least a second responsive data associated with the second response, the second responsive data including one of the plurality of responsive data types; and
generate a second metric, the second metric including a second metric count for each of the plurality of responsive data types of the second response;
aggregate the second metric count for each of the plurality of responsive data types of the second response; and
generate a conversation analytics based on the aggregation of the first metric count for each of the plurality of responsive data types of the first response and, where the second response is received, the aggregation of the second metric count for each of the plurality of responsive data types of the second response.

2. The system of claim 1, the conversation analytics indicating the first prompt and, the aggregation of the first metric count for each of the plurality of responsive data types of the first responsive data and, where the second response is received, further indicating the second prompt and the aggregation of the second metric count for each of the plurality of responsive data types of the second responsive data.

3. The system of claim 2, the memory further includes computer executable instructions that cause the one or more processors to: display information indicating the conversation analytics and each of the plurality of responsive data types of the first responsive data with a respective first metric count with its respective first metric count and, where the second response is received, further indicating each of the plurality of responsive data types of the second responsive data with a respective second metric count with its respective second metric count.

4. The system of claim 2, the abandonment of the conversation comprising one of an expiration of a predetermined time to receive the responsive data or a receipt of the close action and the action comprising one of redirecting the conversation to a page inside the application, to a page outside the application or to a universal record locator, or sharing information about one of the conversation or the application outside of the application.

5. The device of claim 1, the memory further includes computer-executable instructions that cause the one or more processors to:
based on the aggregation of the first metric count for each of the plurality of responsive data types, identify the first metric count indicating a highest count of one the plurality of responsive data types for the first responsive data of the data entry or the data selection for the plurality of launches, and, where the second response is received, based on the aggregation of the second metric count for each of the plurality of responsive data types, identify the second metric count indicating a highest count of one of the plurality of responsive data types for the second responsive data of the data entry or the data selection for the plurality of launches.

6. The device of claim 5, the memory further includes computer executable instructions that cause the one or more processors to: generate a recommendation for the conversation for at least one of the plurality of prompts or the plurality of responses based on the one of the responsive data types having the highest count for the first metric count.

7. The device of claim 6, where the second response is received, the recommendation for the conversation further based on the one of the responsive data types having the highest count for the second metric count.

8. The device of claim 5, the memory further includes computer executable instructions that cause the one or more processors to:
receive the recommendation for the conversation;
replace one of the plurality of prompts or the plurality of responses with the recommendation;
create an updated conversation based at least in part on the recommendation; and
launch the updated conversation in the application.

9. The system of claim 1, at least one of the plurality of prompts or one of the plurality of responses being assigned to one of a user property, a segment, a combination of user properties or a combination of segments, and the user property being associated with at least one of a user profile, an identification associated with the user or an identification associated with a device on which the application is running.

10. The system of claim 8, at least one of the plurality of prompts or one of the plurality of responses being assigned to one of a user property, a segment, a combination of user properties or a combination of segments, and the user property being associated with at least one of a user profile, an identification associated with the user or an identification associated with a device on which the application is running, and the recommendation further based on the one of the a user property, the segment, the combination of user properties or the combination of segments, the memory further includes computer-executable instructions that cause the one or more processors to:
receive the recommendation for the conversation;
replace one of the plurality of prompts or the plurality of responses with the recommendation;
create an updated conversation based at least in part on the recommendation; and
launch the updated conversation in the application.

11. A system comprising:
one or more processors; and
a memory including computer-executable instructions that, when executed, cause the processor to:
launch a conversation configured for installation in an application, the conversation including a plurality of prompts, the plurality of prompts including at least a first prompt and a second prompt, a plurality of responses, the plurality of responses including at least a first response associated with the first prompt, and at least a second response associated with the second prompt, and a close action;
receive an indication for each of a plurality of launches of the conversation in the application;
for each of the plurality of launches:
receive at least a first responsive data associated with the first response, the first responsive data including one of a plurality of responsive data types, the responsive data types including one of a data entry, a data selection, an action or an abandonment of the conversation;

generate a first metric, the first metric including a first metric count for each of the plurality of responsive data types of the first response;

aggregate the first metric count for each of the plurality of responsive data types of the first response;

detect whether the second response is received; and upon detection of a receipt of the second response:

receive at least a second responsive data associated with the second response, the second responsive data including one of the plurality of responsive data types; and generate a second metric, the second metric including a second metric count for each of the plurality of responsive data types of the second response;

aggregate the second metric count for each of the plurality of responsive data types of the second response;

and generate a conversation analytics based on the aggregation of the first metric count for each of the plurality of responsive data types of the first response and, associated with receipt of the second response, the aggregation of the second metric count for each of the plurality of responsive data types of the second response.

12. The system of claim 11, the conversation analytics indicating the first prompt and, the aggregation of the first metric count for each of the plurality of responsive data types of the first responsive data and, associated with receipt of the second response, further indicating the second prompt and the aggregation of the second metric count for each of the plurality of responsive data types of the second responsive data.

13. The system of claim 12, the memory further includes computer-executable instructions that cause the one or more processors to:

display information indicating the conversation analytics and each of the plurality of responsive data types of the first responsive data with a respective first metric count with its respective first metric count and, associated with receipt of the second response, further indicating each of the plurality of responsive data types of the second responsive data with a respective second metric count with its respective second metric count.

14. The system of claim 12, the abandonment of the conversation comprising one of an expiration of a predetermined time to receive the responsive data or a receipt of the close action and the action comprising one of redirecting the conversation to a page inside the application, to a page outside the application or to a universal record locator, or sharing information about one of the conversation or the application outside of the application.

15. The device of claim 11, the memory further includes computer-executable instructions that cause the one or more processors to:

based on the aggregation of the first metric count for each of the plurality of responsive data types, identify the first metric count indicating a highest count of one the plurality of responsive data types for the first responsive data of the data entry or the data selection for the plurality of launches, and, associated with receipt of the second response, based on the aggregation of the second metric count for each of the plurality of responsive data types, identify the second metric count indicating a highest count of one of the plurality of responsive data types for the second responsive data of the data entry of the data selection for the plurality of launches.

16. The device of claim 15, the memory further includes computer executable instructions that cause the one or more processors to: generate a recommendation for the conversation for at least one of the plurality of prompts or the plurality of responses based on the one of the responsive data types having the highest count for the first metric count.

17. The device of claim 15, the memory further includes computer executable instructions that cause the one or more processors to:

receive the recommendation for the conversation;

replace one of the plurality of prompts or the plurality of responses with the recommendation;

create an updated conversation based at least in part on the recommendation; and launch the updated conversation in the application.

18. The system of claim 11, at least one of the plurality of prompts or one of the plurality of responses being assigned to one of a user property, a segment, a combination of user properties or a combination of segments, and the user property being associated with at least one of a user profile, an identification associated with the user or an identification associated with a device on which the application is running, and the recommendation further based on the one of the a user property, the segment, the combination of user properties or the combination of segments, the memory further includes computer-executable instructions that cause the one or more processors to:

receive the recommendation for the conversation;

replace one of the plurality of prompts or the plurality of responses with the recommendation;

create an updated conversation based at least in part on the recommendation;

and launch the updated conversation in the application.

19. The system of claim 11, the plurality of prompts prompt comprising a text prompt and the plurality of responses response comprising one of a text prompt, a data entry, a data selection, an audio input, a visual input, an action to end the conversation, an action to direct the conversation to a location in the mobile application or an action to share data about one of the mobile application or another location in the mobile application.

20. A method comprising:

launching a conversation configured for installation in an application, the conversation includes a plurality of prompts, the plurality of prompts including at least a first prompt and a second prompt, a plurality of responses, the plurality of responses including at least a first response associated with the first prompt, and at least a second response associated with the second prompt, and a close action;

receiving an indication for each of a plurality of launches of the conversation in the application;

for each of the plurality of launches:

receiving at least a first responsive data associated with the first response, the first responsive data includes one of a plurality of responsive data types, the responsive data types includes one of a data entry, a data selection, an action or an abandonment of the conversation;

generating a first metric, the first metric includes a first metric count for each of the plurality of responsive data types of the first response;

aggregating the first metric count for each of the plurality of responsive data types of the first response;

detecting whether the second response is received; and upon detection of a receipt of the second response:

receiving at least a second responsive data associated with the second response, the second responsive data including one of the plurality of responsive data types; and generating a second metric, the second metric includes a second metric count for each of the plurality of responsive data types of the second response;

aggregating the second metric count for each of the plurality of responsive data types of the second response; and generating a conversation analytics based on the aggregation of the first metric count for each of the plurality of responsive data types of the first response and, associated with receipt of the second response, the aggregation of the second metric count for each of the plurality of responsive data types of the second response.

21. The method as recited in claim 20, further comprising displaying information indicating the conversation analytics and each of the plurality of responsive data types of the first responsive data with a respective first metric count with its respective first metric count and, associated with receipt of the second response, each of the plurality of responsive data types of the second responsive data with a respective second metric count with its respective second metric count.

\* \* \* \* \*